US012681029B2

(12) United States Patent
Sasaki et al.

(10) Patent No.: US 12,681,029 B2
(45) Date of Patent: Jul. 14, 2026

(54) AUTOMATIC MEASURING SYSTEM AND CONTROL METHOD FOR AUTOMATIC MEASURING SYSTEM

(71) Applicant: MITUTOYO CORPORATION, Kanagawa (JP)

(72) Inventors: Seiji Sasaki, Saitama (JP); Kazuhiko Hidaka, Tokyo (JP); Daisuke Sakai, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 329 days.

(21) Appl. No.: 18/630,618

(22) Filed: Apr. 9, 2024

(65) Prior Publication Data

US 2024/0345116 A1 Oct. 17, 2024

(30) Foreign Application Priority Data

Apr. 14, 2023 (JP) ................................. 2023-066773

(51) Int. Cl.
  *G01B 5/12* (2006.01)
  *G01B 3/00* (2006.01)
  *G01N 35/00* (2006.01)
(52) U.S. Cl.
  CPC ......... *G01N 35/0099* (2013.01); *G01B 3/008* (2013.01); *G01B 5/12* (2013.01); *G01N 35/00584* (2013.01)
(58) Field of Classification Search
  CPC ....... G01N 35/0099; G01B 3/008; G01B 5/12
  USPC .......................................... 33/559, 560, 542
  See application file for complete search history.

(56) References Cited

U.S. PATENT DOCUMENTS

| | | | | | |
|---|---|---|---|---|---|
| 4,262,425 A | * | 4/1981 | Sabato | ............... | G01N 27/9006 |
| | | | | | 33/544.2 |
| 4,301,338 A | * | 11/1981 | McMurtry | ............. | G01B 7/012 |
| | | | | | 200/61.42 |
| 4,453,316 A | * | 6/1984 | Marveggio | .............. | G01B 5/12 |
| | | | | | 33/783 |

(Continued)

FOREIGN PATENT DOCUMENTS

| | | |
|---|---|---|
| JP | 8-14871 | 1/1996 |
| JP | 2010-19783 | 1/2010 |

OTHER PUBLICATIONS

U.S. Appl. No. 18/631,483 to Sakai et al., filed Apr. 10, 2024.

*Primary Examiner* — George B Bennett
(74) *Attorney, Agent, or Firm* — Greenblum & Bernstein, P.L.C.

(57) ABSTRACT

There is provided an automatic measuring system that can automate measurement and a control method for automatic measurement. An automatic measuring system includes a measuring sensor tool that detects a surface of an object to be measured with a probe to measure a dimension or a shape of the object to be measured, and a multi-axis moving mechanism that relatively moves the measuring sensor tool with respect to the object to be measured. The measuring sensor tool includes a cover part to protect the probe. In an approaching step in which the moving mechanism causes the measuring sensor tool to approach a point to be measured of the object to be measured, the cover part accommodates the probe inside the cover part. After the approaching step is completed, the probe is exposed from the cover part to detect the surface of the object to be measured.

7 Claims, 26 Drawing Sheets

(56) References Cited

U.S. PATENT DOCUMENTS

| | | | | |
|---|---|---|---|---|
| 4,763,417 | A * | 8/1988 | Ernst ..................... | G01B 11/007 33/561 |
| 5,491,904 | A * | 2/1996 | McMurtry ............. | G01B 5/012 33/561 |
| 5,819,429 | A * | 10/1998 | Matsuhashi ............ | G01B 5/012 33/561 |
| 6,088,923 | A * | 7/2000 | Guerin ................... | G01B 5/201 33/542 |
| 6,523,273 | B1 * | 2/2003 | Nishioki ............... | G01B 5/016 33/561 |
| 6,789,327 | B2 * | 9/2004 | Roth ...................... | G01B 7/012 33/559 |
| 7,269,911 | B2 * | 9/2007 | Madlener ............... | G01B 5/012 33/561 |
| 7,398,603 | B2 * | 7/2008 | Liu ........................ | G01B 3/008 33/559 |
| 7,650,701 | B2 * | 1/2010 | Liu ........................ | G01B 5/012 33/DIG. 2 |
| 7,726,036 | B2 * | 6/2010 | Liu ........................ | G01B 5/012 33/503 |
| 9,810,622 | B2 * | 11/2017 | Hagen .............. | G01N 35/00871 |
| 12,590,794 | B2 * | 3/2026 | Ogawa ..................... | G01B 5/12 |
| 2008/0307664 | A1 * | 12/2008 | Wong .................... | G01B 5/245 33/534 |
| 2009/0056157 | A1 * | 3/2009 | Aoki ........................ | G01B 1/00 33/503 |
| 2010/0005676 | A1 | 1/2010 | Fujikawa et al. | |
| 2020/0200779 | A1 * | 6/2020 | Sigler ............... | G01N 35/1011 |
| 2023/0304784 | A1 * | 9/2023 | Yamaji ..................... | G01B 5/12 |

* cited by examiner

CONTROL UNIT —1100

1000

2000

2100

2120

2130

2800

2300

2540

2450

2010

1100

CONTROL UNIT

1200

CENTRAL CONTROL UNIT

1300

ROBOT-ARM DRIVE CONTROL UNIT

1400

MEASUREMENT-OPERATION CONTROL UNIT (APPROACHING STEP)

(MEASURING STEP)

2450

2500

2450

2500

AUTOMATIC MEASURING SYSTEM AND CONTROL METHOD FOR AUTOMATIC MEASURING SYSTEM

INCORPORATION BY REFERENCE

This application is based upon and claims the benefit of priority from JP patent application No. 2023-066773, filed on Apr. 14, 2023 (DAS code EAB2), the disclosure of which is incorporated herein in its entirety by reference.

BACKGROUND OF THE INVENTION

1. Field of the Invention

The present invention relates to an automatic measuring system and a control method for the automatic measuring system.

2. Description of Related Art

Measuring devices for measuring the inside diameter of a hole are inside-diameter measuring devices, such as hole tests, cylinder gauges, and Borematic (registered trademark) (see, for example, JP 2010-19783 A). However, when using such an inside-diameter measuring device, manual measurement is inevitably required, because it is necessary to move its probe forward and backward and to perform centering to some extent while the inside-diameter measuring device is inserted in the hole. Therefore, it takes a lot of manpower and time to check the machining accuracy of a hole with such an inside-diameter measuring device.

As an alternative to manual measurement, an air micrometer is an inside-diameter measuring apparatus that automates inside-diameter measurement at production sites (see, for example, JP H8-14871 A). The air micrometer, which is simply inserted into a hole and blows air out, is a suitable measuring apparatus for automating inside-diameter measurement among the current options.

Patent Literature 1: JP 2010-19783 A
Patent Literature 2: JP H08-14871 A

SUMMARY OF THE INVENTION

However, air micrometers also have the following disadvantages.

First, air micrometers are very expensive because of their structure. In addition, an air compressor needs to be prepared and maintained. In terms of measurement capability, the repeatability of air micrometers is limited due to their structure, and their measurement range is extremely short (a few hundred micrometers).

The demand to automate measurement as inexpensively as possible has been a common problem with manual measurement using manual measuring devices.

There is a need for an automatic measuring system that is inexpensive, easy to use, has a wide measurement range, and can automate measurement, and a control method for automatic measurement.

An automatic measuring system according to an exemplary embodiment of the present invention includes:

a measuring sensor tool that detects a surface of an object to be measured with a probe to measure a dimension or a shape of the object to be measured; and a moving mechanism that relatively moves the measuring sensor tool with respect to the object to be measured, in which the measuring sensor tool includes a cover part to protect the probe, in an approaching step in which the moving mechanism causes the measuring sensor tool to approach a point to be measured of the object to be measured, the cover part accommodates the probe inside the cover part, and after the approaching step is completed, the probe is exposed from the cover part to detect the surface of the object to be measured.

In an exemplary embodiment of the present invention, it is preferable that the automatic measuring system further includes a cover contact detecting means for detecting contact between the cover part and the object to be measured, in which when contact between the cover part and the object to be measured is detected by the cover contact detecting means in the approaching step, the moving mechanism stops the relative movement between the measuring sensor tool and the object to be measured or moves the measuring sensor tool and the object to be measured in a direction opposite to a direction of the movement at that time.

In an exemplary embodiment of the present invention, it is preferable that the automatic measuring system further includes a cover contact detecting means for detecting contact between the cover part and the object to be measured, in which when contact between the cover part and the object to be measured is detected by the cover contact detecting means in the approaching step, the moving mechanism relatively moves the measuring sensor tool and the object to be measured in a direction in which an acting force applied from the object to be measured to the cover part is reduced.

In an exemplary embodiment of the present invention, it is preferable that the measuring sensor tool brings one or more of the probes into contact with the object to be measured at a predetermined measurement pressure to acquire the dimension or the shape of the object to be measured, the automatic measuring system further includes a force detecting means for detecting a direction and a magnitude of a force received by the one or more of the probes from the object to be measured, the force detecting means is provided on the measuring sensor tool or on an attaching column to be used to attach the measuring sensor tool to the moving mechanism, and the moving mechanism relatively moves, based on the force detected by the force detecting means, the measuring sensor tool and the object to be measured in such a manner that a measurement pressure of the one or more of the probes is equal to the predetermined measurement pressure.

In an exemplary embodiment of the present invention, it is preferable that the probe is a non-contact probe configured to detect the surface of the object to be measured without contact.

In an exemplary embodiment of the present invention, it is preferable that the moving mechanism is an articulated robot, the measuring sensor tool is supported by a finger part of the articulated robot, a compliance mechanism is provided between the finger part and the measuring sensor tool, and absorbs relative misalignment between the finger part and the measuring sensor tool and recovers the relative position between the finger part and the measuring sensor tool, when the cover part is brought into contact with the object to be measured in the approaching step, the moving mechanism causes the measuring sensor tool to approach the point to be measured while the compliance mechanism absorbs the relative misalignment between the finger part and the measuring sensor tool to automatically adjust a relative posture between the measuring sensor tool and the point to be measured, and after the approaching step is completed, the probe is exposed from the cover part to detect the surface of the object to be measured while the moving mechanism is stopped.

A control method for an automatic measuring system according to an exemplary embodiment of the present invention, the automatic measuring system including:

a measuring sensor tool that detects a surface of an object to be measured with a probe to measure a dimension or a shape of the object to be measured; and a moving mechanism that relatively moves the measuring sensor tool with respect to the object to be measured, the measuring sensor tool including a cover part to protect the probe, the control method includes:

accommodating, by the cover part, the probe inside the cover part, causing, by the moving mechanism, the measuring sensor tool to approach a point to be measured of the object to be measured, and after the approach is completed, exposing the probe from the cover part and detecting, by the probe, the surface of the object to be measured while the moving mechanism is stopped.

DETAILED DESCRIPTION

Figure 1:
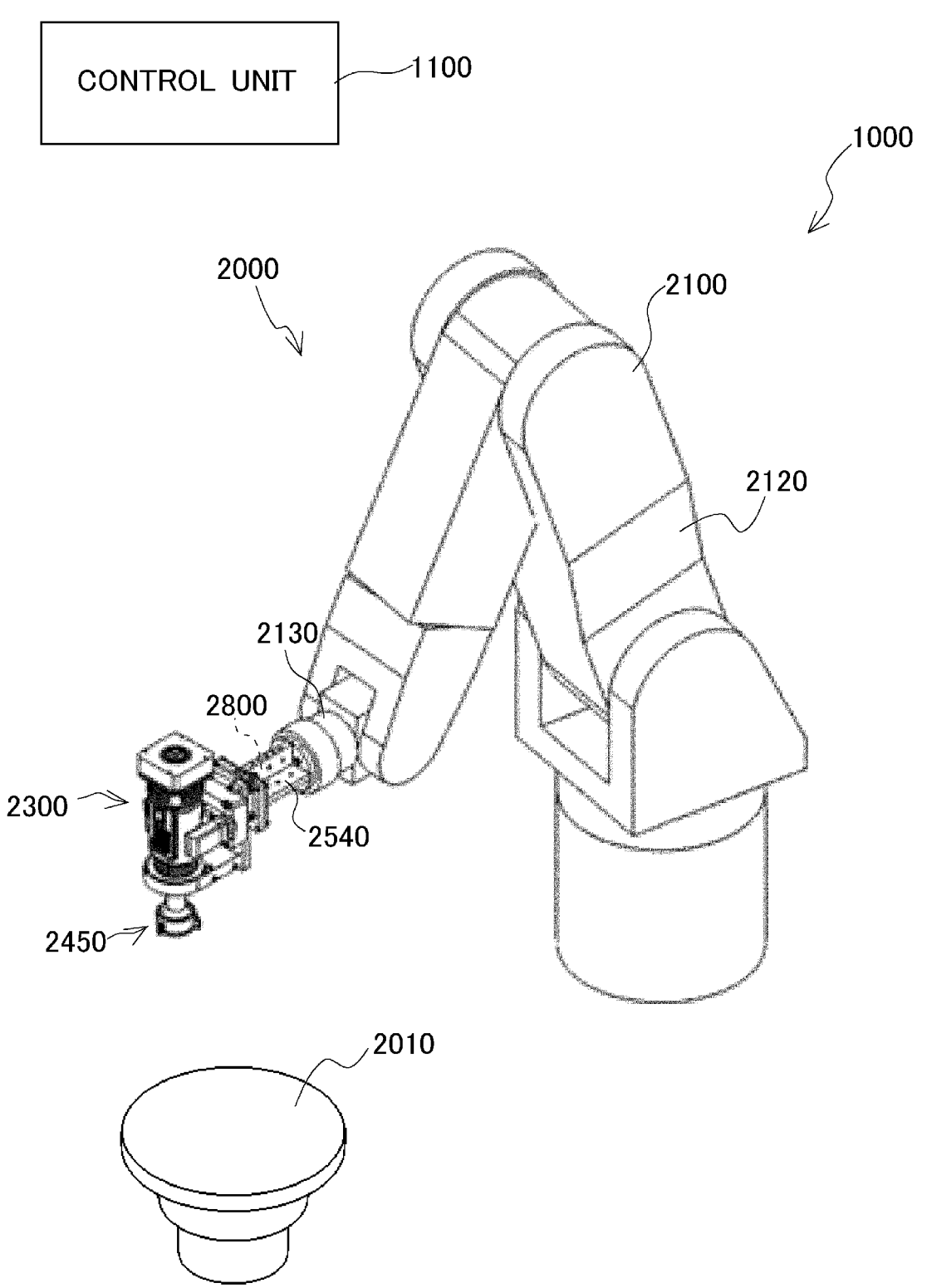
FIG. 1 is an overall external view of an automatic measuring system.

Embodiments of the present invention are illustrated and described with reference to the reference signs assigned to the elements in the drawings.

First Exemplary Embodiment

In the following, a first exemplary embodiment of the present invention is described.

The present exemplary embodiment describes an automatic measuring system 1000 that automates measurement of a dimension or a shape of an object to be measured.

The first exemplary embodiment describes a case in which a point to be measured is an inside diameter of a hole formed in an object to be measured (workpiece), and therefore a measuring sensor tool is an electric inside-diameter measuring unit 2300.

FIG. 1 shows an overall external view of the automatic measuring system 1000.

The automatic measuring system 1000 includes a measuring-device main body 2000 and a control unit 1100 that controls the overall operation.

(Measuring-Device Main Body 2000)

The measuring-device main body 2000 includes an articulated robot (articulated robot arm part 2100) as a moving mechanism and an electric inside-diameter measuring unit 2300 as a measuring sensor tool attached to a finger part 2130 of the articulated robot arm part 2100. The electric inside-diameter measuring unit 2300 is attached to the finger part 2130 of the articulated robot arm part 2100 by a measuring-device attaching column 2540.

The articulated robot arm part 2100 is what is called a robot arm, and moves the finger part 2130, which is the tip of the robot arm part 2100, in three dimensions with a plurality of rotary drive axes.

The measuring-device main body 2000 may further include a rotary table 2010, in which case the rotary table 2010 is also to be integrated and controlled as part of the articulated robot arm part 2100.

The articulated robot arm part 2100 includes a base part 2110 to be installed on the floor or the like, a multi-axis arm part 2120 supported by the base part 2110, and a finger part 2130 provided at the tip of the arm part 2120.

Figure 2:
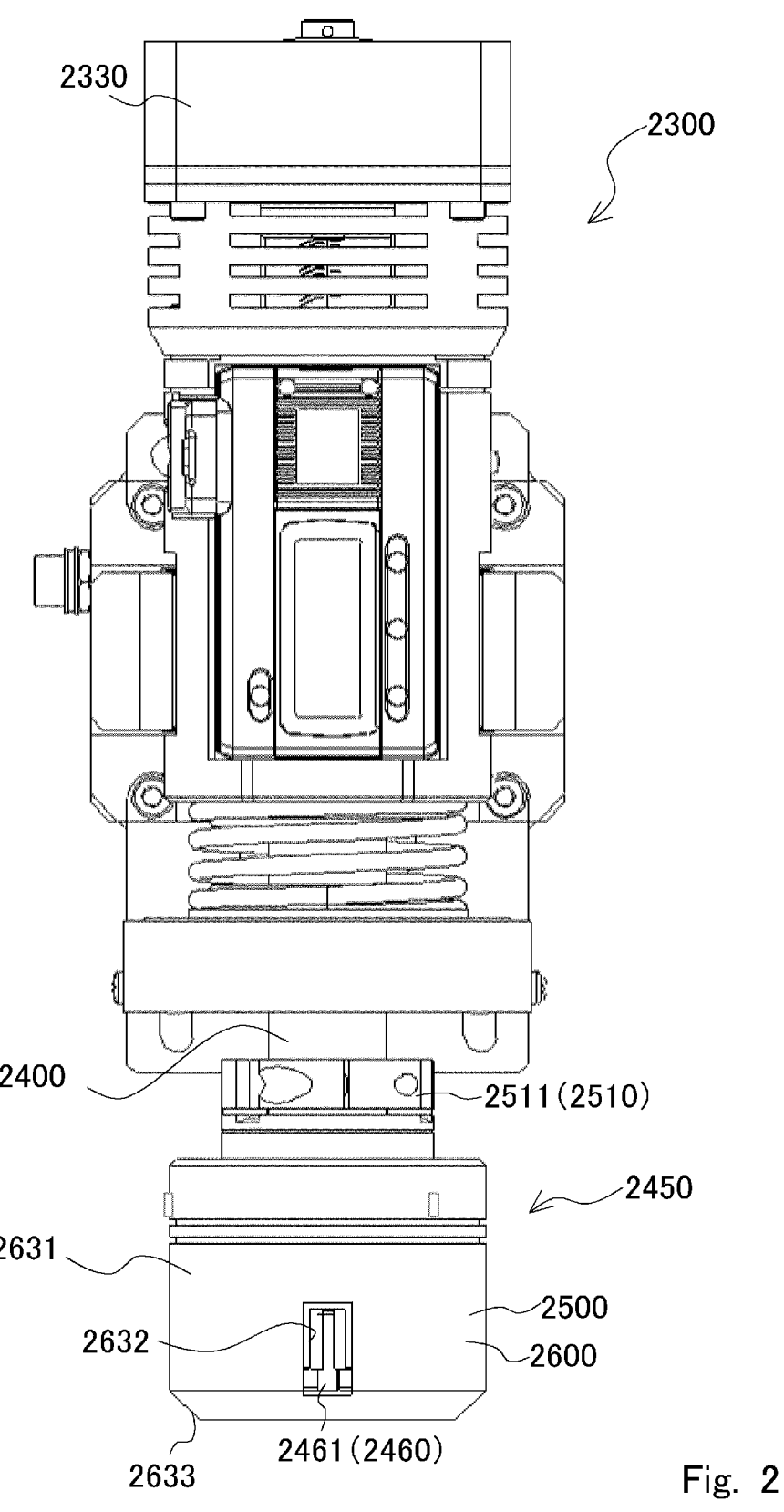
FIG. 2 is a view of an electric inside-diameter measuring unit.

FIG. 2 is a view of the electric inside-diameter measuring unit 2300.

Figure 3:
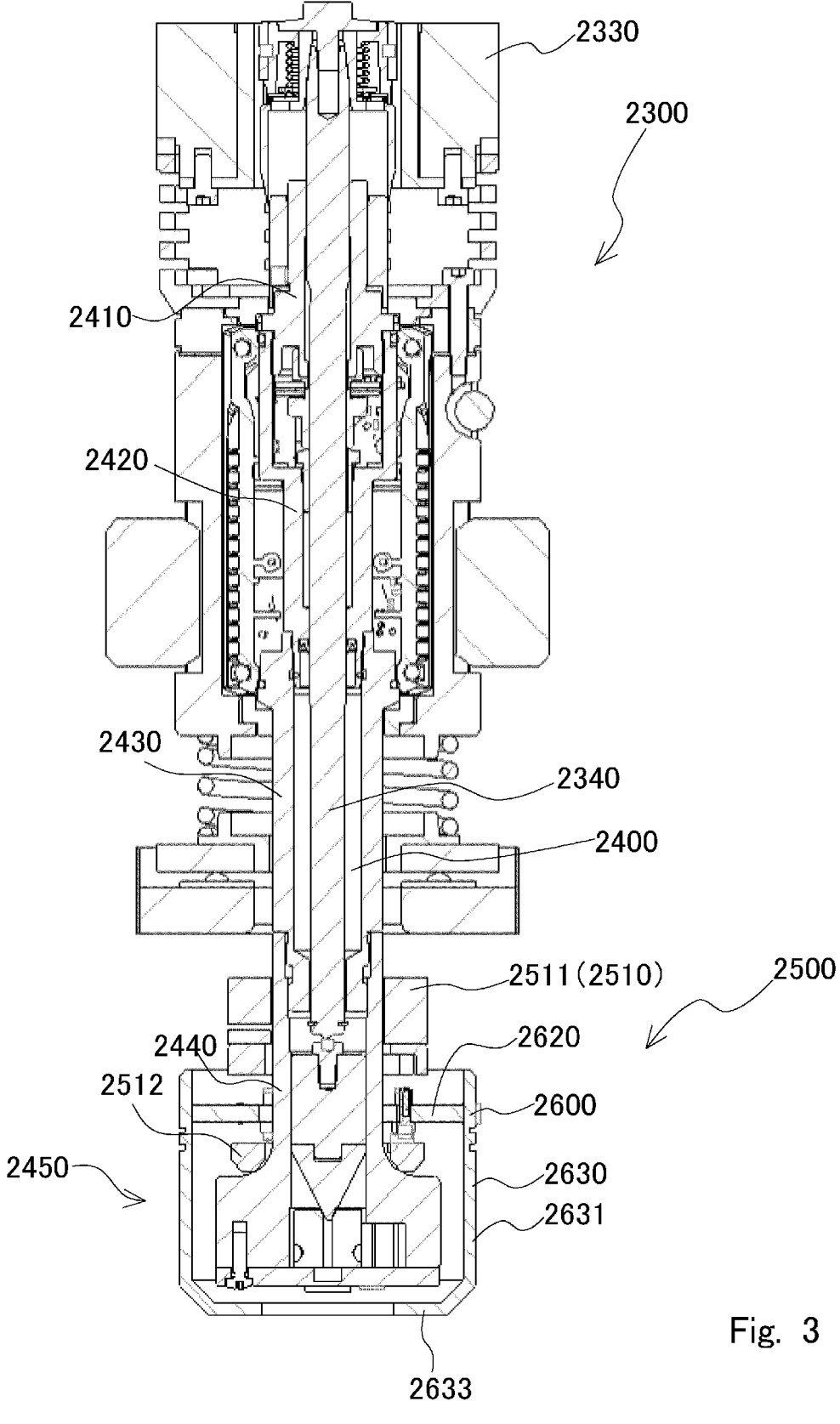
FIG. 3 is a cross-sectional view of the electric inside-diameter measuring unit.

FIG. 3 is a cross-sectional view of the electric inside-diameter measuring unit 2300.

Figure 4:
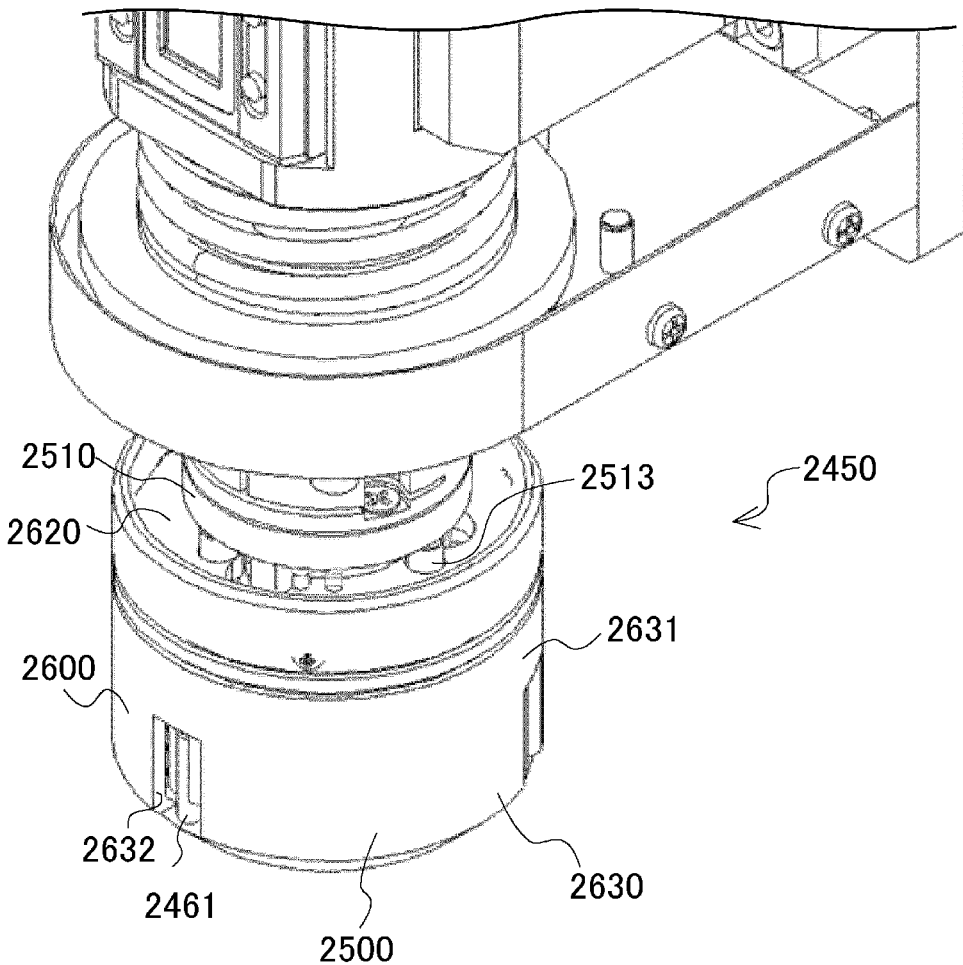
FIG. 4 is a view of a measuring head part of the electric inside-diameter measuring unit, with a probe accommodated inside a cover part.

FIG. 4 is a view of a measuring head part 2450 of the electric inside-diameter measuring unit 2300, with a probe 2460 accommodated inside a cover part 2500.

Figure 5:
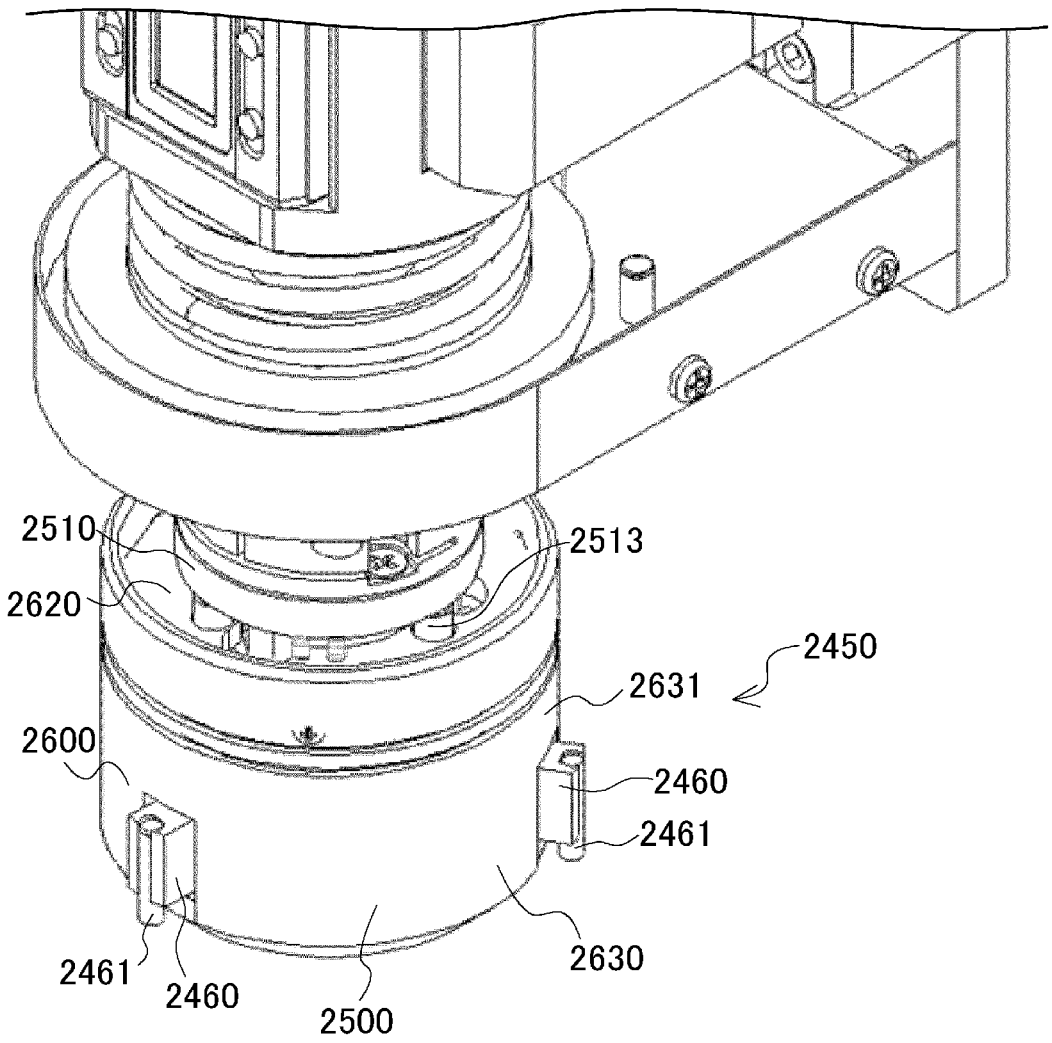
FIG. 5 is a view of the measuring head part of the electric inside-diameter measuring unit, with the probe moved forward and exposed outside the cover part.

FIG. 5 is a view of the measuring head part 2450 of the electric inside-diameter measuring unit 2300, with the probe 2460 moved forward and exposed outside the cover part 2500.

Figure 6:
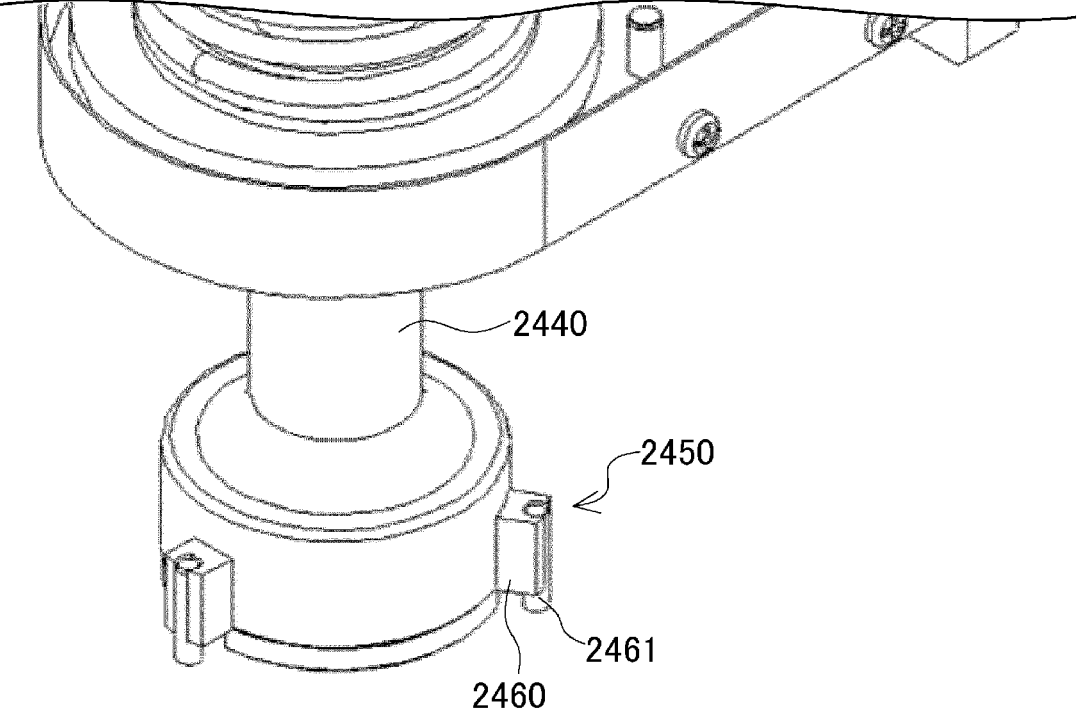
FIG. 6 is a view of the measuring head part with the cover part removed for contrast.
Figure 7:
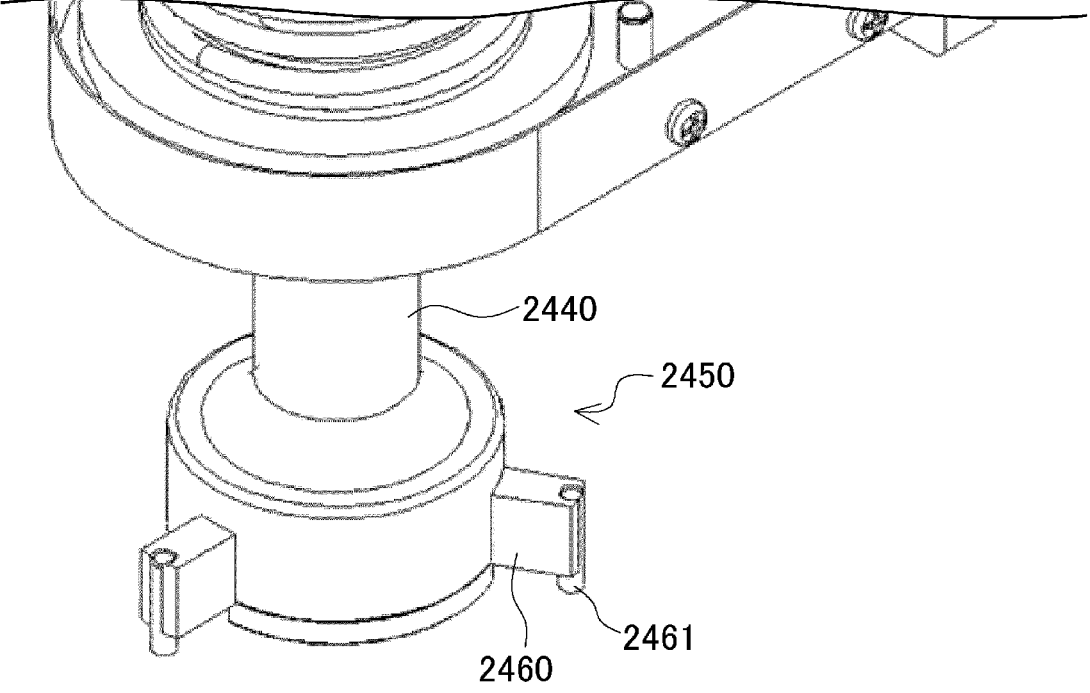
FIG. 7 is a view of the measuring head part with the cover part removed for contrast.

FIGS. 6 and 7 are views of the measuring head part 2450 with the cover part 2500 removed for contrast with FIGS. 4 and 5.

The electric inside-diameter measuring unit 2300 is what the feed of a rod 2340 of an inside-diameter measuring device (for example, a hall test) is motorized.

In other words, the electric inside-diameter measuring unit 2300 moves the rod 2340 upward and downward by the power of a motor 2330 to automatically move the probe 2460 forward and backward, instead of being manually operated.

Between the motor 2330 and the rod 2340 (in other words, in the middle of the power transmission path from the motor to the probe), a constant pressure mechanism that regulates the upper limit of a force (measuring force) acting between an object to be measured and the probe 2460 is provided. The constant pressure mechanism can be implemented by a ratchet mechanism, for example. To measure the inside diameter of a hole to be measured, which is an object to be measured, the measuring head part 2450 of the electric inside-diameter measuring unit 2300 is first inserted into the hole to be measured by moving the finger part 2130 of the articulated robot arm part 2100. After the measuring head part 2450 of the electric inside-diameter measuring unit 2300 is inserted into the hole to be measured, the motor 2330 of the electric inside-diameter measuring unit 2300 is driven to automatically move the probe 2460 forward and backward and bring the probe 2460 into contact with the inner wall of the hole to acquire a measurement value of the hole diameter.

The electric inside-diameter measuring unit 2300 includes a cylinder case part 2400 surrounding the rod 2340 that moves forward and backward in an axial direction.

The cylinder case part 2400 is a cylindrical case as a whole.

The cylinder case part 2400 includes an upper cylinder case part 2400 constituting an upper part, a middle cylinder case part 2400 constituting a middle part, a lower cylinder case part 2400 constituting a lower part, and a head cylinder part 2440 constituting the measuring head part 2450. The middle cylinder case part 2400 is attached to the lower end of the upper cylinder case part 2400, the lower cylinder case part 2400 is attached to the lower end of the middle cylinder case part 2400, and the head cylinder part 2440 is attached to the lower end of the lower cylinder case part 2400. The lower end of the head cylinder part 2440 extends outward to be larger in diameter, and this larger diameter part at the lower end is referred to as the measuring head part 2450.

The head cylinder part 2440 is provided with the probe 2460 that moves forward and backward in a direction orthogonal to the axial direction of the rod 2340.

Three of the probes 2460 are disposed in the head cylinder part 2440 at 120° intervals. Each of the probes 2460 includes a thin round shaft tip 2461 made of carbide at its outer end. When each probe 2460 moves forward in the protruding direction, the round shaft tip 2461 is brought into contact with the inner wall of the hole to be measured.

The inner end side of each probe 2460 is formed with a tapered surface, and the tapered surface is brought into contact with a conical surface on the lower end side of the rod 2340. The conical surface of the rod 2340 and the tapered surface of each probe 2460 cause the forward/backward movement of the rod 2340 in the axial direction to change direction at right angles, which allows each probe 2460 to move forward and backward toward the inner wall of the hole.

The electric inside-diameter measuring unit 2300 includes a cover part 2500 to protect the measuring head part 2450.

Figure 8:
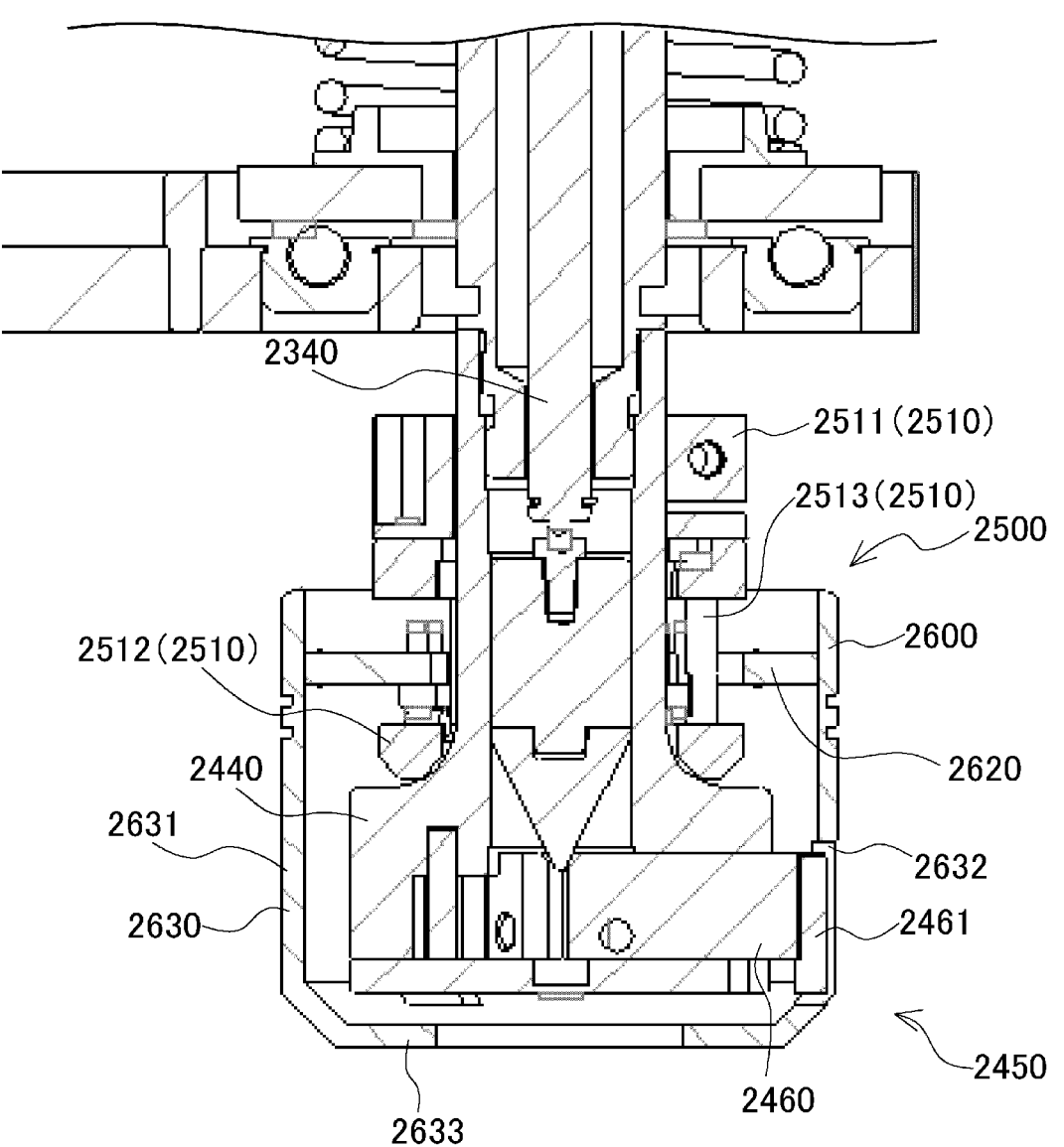
FIG. 8 is an enlarged cross-sectional view of the measuring head part.
Figure 9:
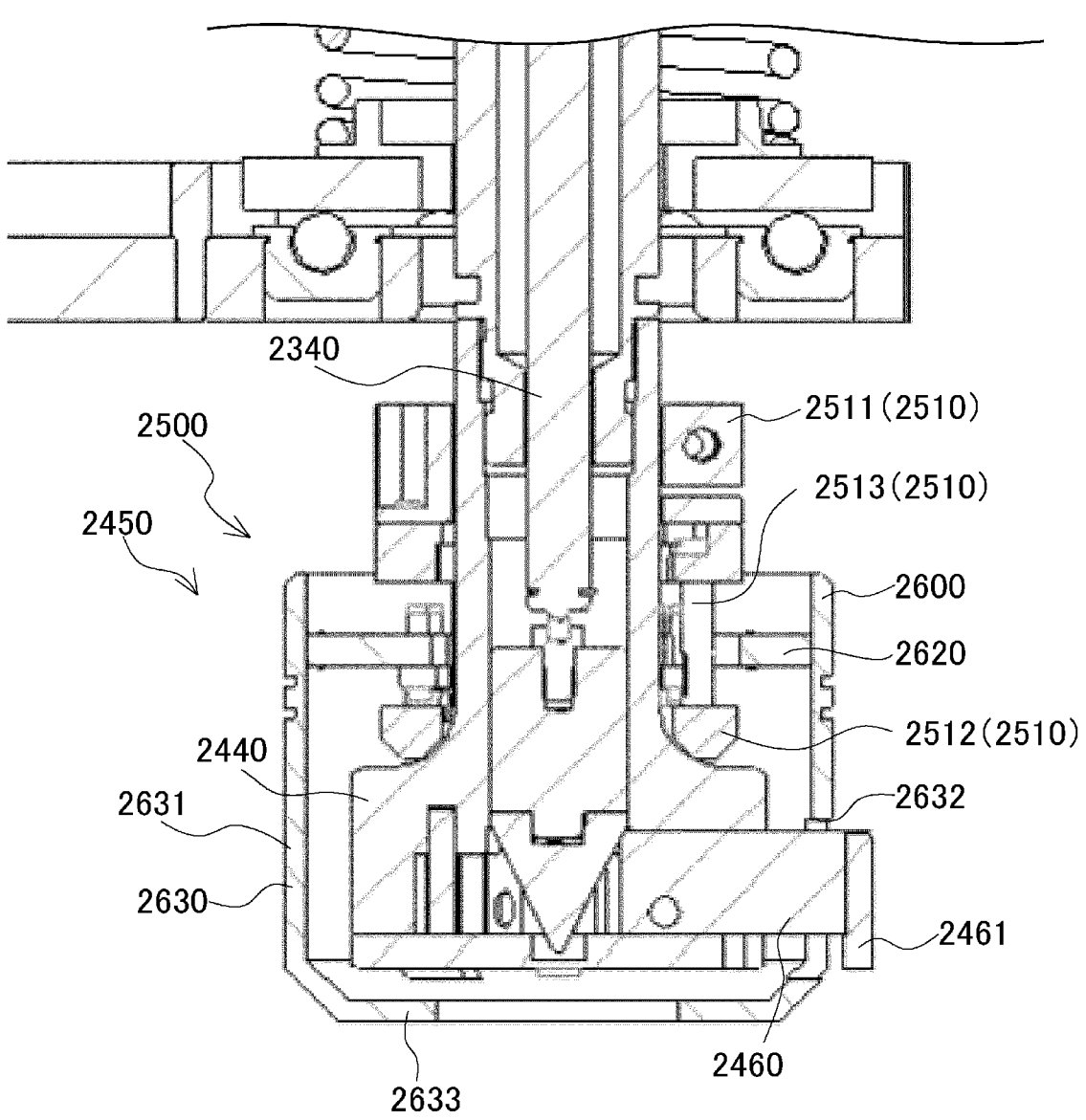
FIG. 9 is an enlarged cross-sectional view of the measuring head part.

FIGS. 8 and 9 are enlarged cross-sectional views of the cover part 2500 and the measuring head part 2450, with the cover part 2500 attached to the electric inside-diameter measuring unit 2300.

Figure 10:
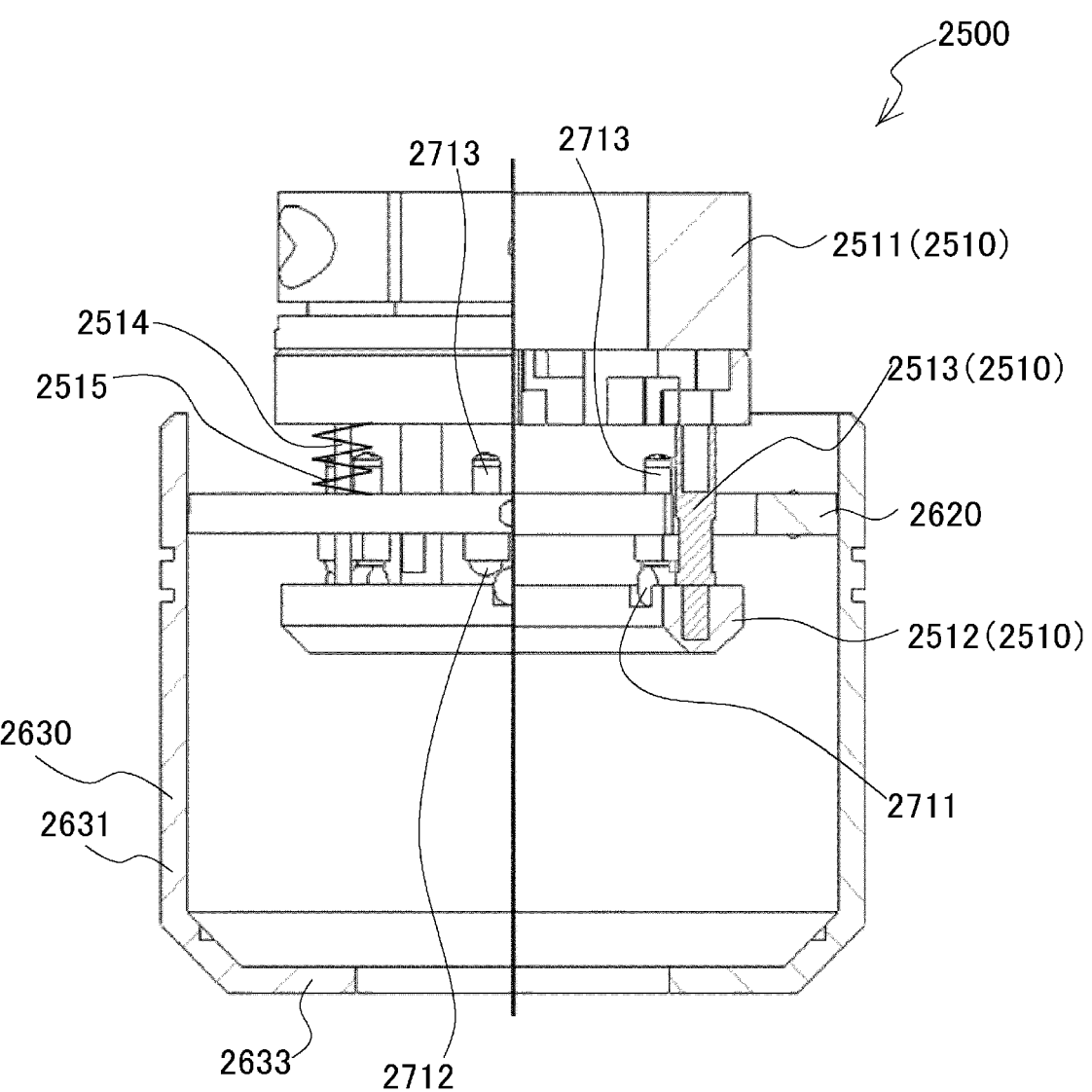
FIG. 10 is a partial cross-sectional view of the cover part.

FIG. 10 is a partial cross-sectional view of the cover part.

Figure 11:
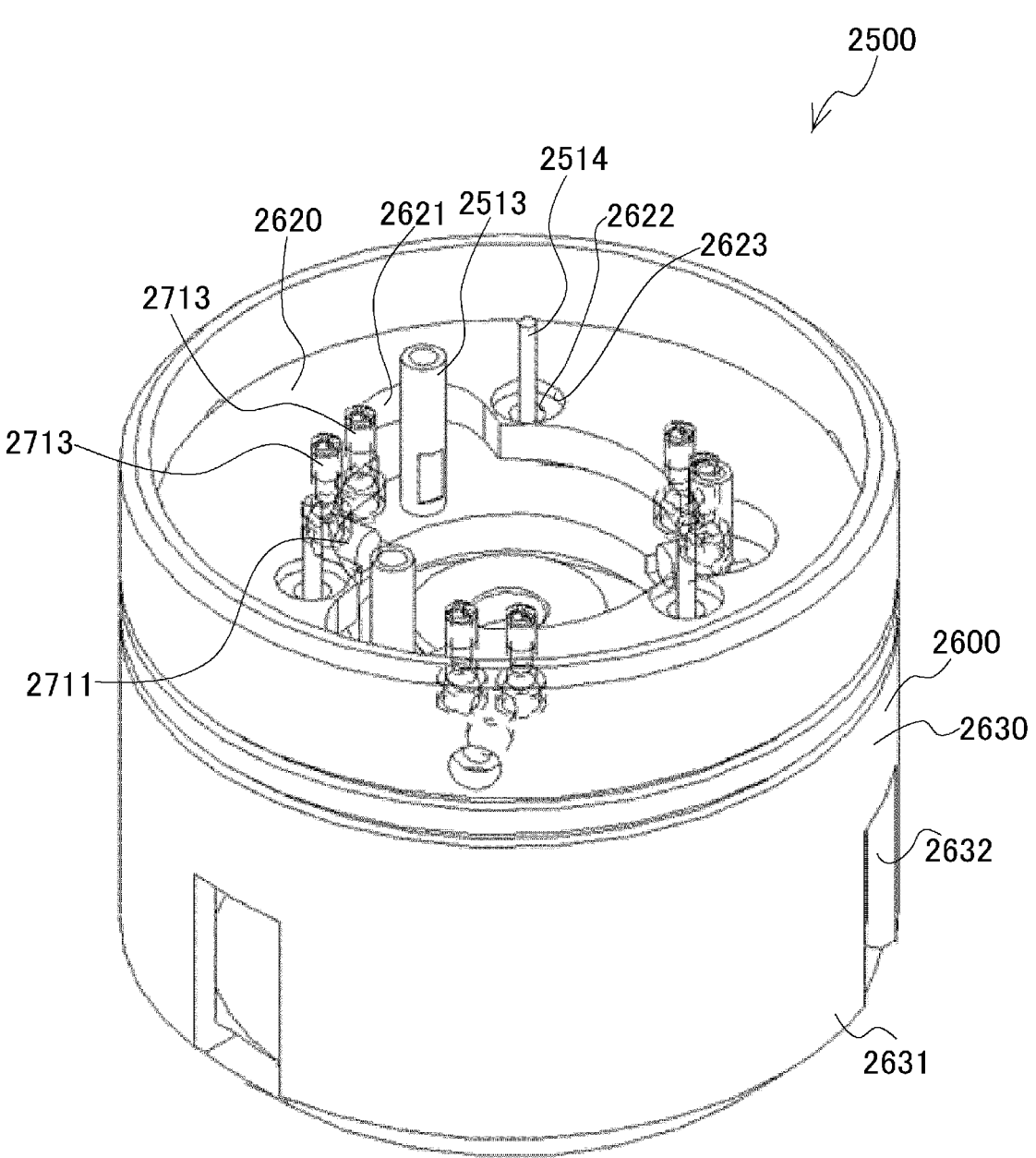
FIG. 11 is a perspective view of the cover part.

FIG. 11 is a perspective view of the cover part.

The cover part 2500 includes a fixed ring part 2510, a cover body part 2600, and a cover displacement sensor 2700.

The fixed ring part 2510 includes an upper ring part 2511, a lower ring part 2512, a main coupling column 2513, and a sub-coupling column 2514.

The upper ring part 2511 is a ring-shaped member that is fixedly attached to the outer circumference on the upper end side of the head cylinder part 2440, as shown in FIGS. 3 to 5 and 8 to 9.

The lower ring part 2512 is a ring-shaped member that is disposed to be placed over the extending part of the head cylinder part 2440, as shown in FIGS. 8 and 9.

The main coupling column 2513 is a rod-shaped member that fixedly couples the upper ring part 2511 to the lower ring part 2512, as shown in FIGS. 8 to 10. The upper end of the main coupling column 2513 is coupled to the upper ring part 2511, and the lower end of the main coupling column 2513 is coupled to the lower ring part 2512, whereby the fixed ring part 2510 is one rigid body fixed to the cylinder case part 2400 of the electric inside-diameter measuring unit 2300.

Here, three of the main coupling columns 2513 are provided at 120° intervals.

The sub-coupling column 2514 is a rod-shaped member thinner than the main coupling column 2513 and is provided to couple the upper ring part 2511 to the lower ring part 2512, as shown in FIGS. 10 and 11. The sub-coupling column 2514 serves as a shaft for disposing a spring 2515 as a biasing means between the upper ring part 2511 and the cover body part 2600. Note that three of the sub-coupling columns 2514 are also provided at 120° intervals.

The cover body part 2600 is disposed so as to be relatively displaceable and recoverable with respect to the measuring head part 2450, and protects the measuring head part 2450.

The cover body part 2600 includes a middle ring disc 2620 and a shield cylinder part 2630.

The middle ring disc 2620 is disposed between the upper ring part 2511 and the lower ring part 2512, and is fixedly connected to the shield cylinder part 2630. The middle ring disc 2620 includes three recessed parts 2621 recessed in the radial direction to pass the main coupling columns 2513 therethrough, and three through holes 2622 provided to pass the sub-coupling columns 2514 therethrough, as shown in FIG. 11. Around each through hole 2622, a counterbore hole 2623 having an enlarged diameter to receive the spring is provided.

As shown in FIG. 10, the spring 2515 is interposed between the middle ring disc 2620 and the upper ring part 2511, using each sub-coupling column 2514 as the shaft.

As a result, the cover body part 2600 is biased downward with respect to the measuring head part 2450 and is relatively displaceable upward and recoverable in position, as can be understood from FIG. 10 and FIGS. 8 and 9.

The middle ring disc 2620 is further provided with a movable side contact 2712 of the cover displacement sensor 2700, which is described later.

The shield cylinder part 2630 is a cylinder body that accommodates the measuring head part 2450 inside, and surrounds the side circumference of the measuring head part 2450 and a part of the lower side of the measuring head part 2450. In the shield cylinder part 2630, the part surrounding the side circumference of the measuring head part 2450 is referred to as a side shield part 2631, and the part protecting the lower side of the measuring head part 2450 is referred to as a lower side shield part 2633. The surface constituted by the side shield part 2631 is a plane parallel to the central axis of the electric inside-diameter measuring unit 2300. The surface constituted by the coupling part between the lower side shield part 2633 and the side shield part 2631 is a tapered surface having an inclination with respect to the central axis of the electric inside-diameter measuring unit 2300, as shown in FIGS. 3, 8, and 9. The inner circumferential surface of the shield cylinder part 2630 and the outer circumferential surface of the middle ring disc 2620 are in close contact with each other, and the shield cylinder part 2630 and the middle ring disc 2620 are fixedly coupled.

The side shield part 2631 includes slits 2632 for passing the probes 2460 therethrough. Here, three slits 2632 are also provided at 120° intervals, since the three probes 2460 are arranged at 120° intervals. When the probes 2460 are in their rearmost positions, the probes 2460 are inside the shield cylinder part 2630, that is, the round shaft tips 2461 are not outside the slits 2632, as shown in FIGS. 2, 3, 4, and 8.

The cover displacement sensor 2700 detects the displacement of the cover body part 2600 with respect to the fixed ring part 2510.

In the present exemplary embodiment, the cover displacement sensor 2700 is a displacement sensor unit 2710 attached to the middle ring disc 2620 between the fixed ring part 2510 and the shield cylinder part 2630. Note that, three of the displacement sensor units 2710 are provided.

Figure 12:
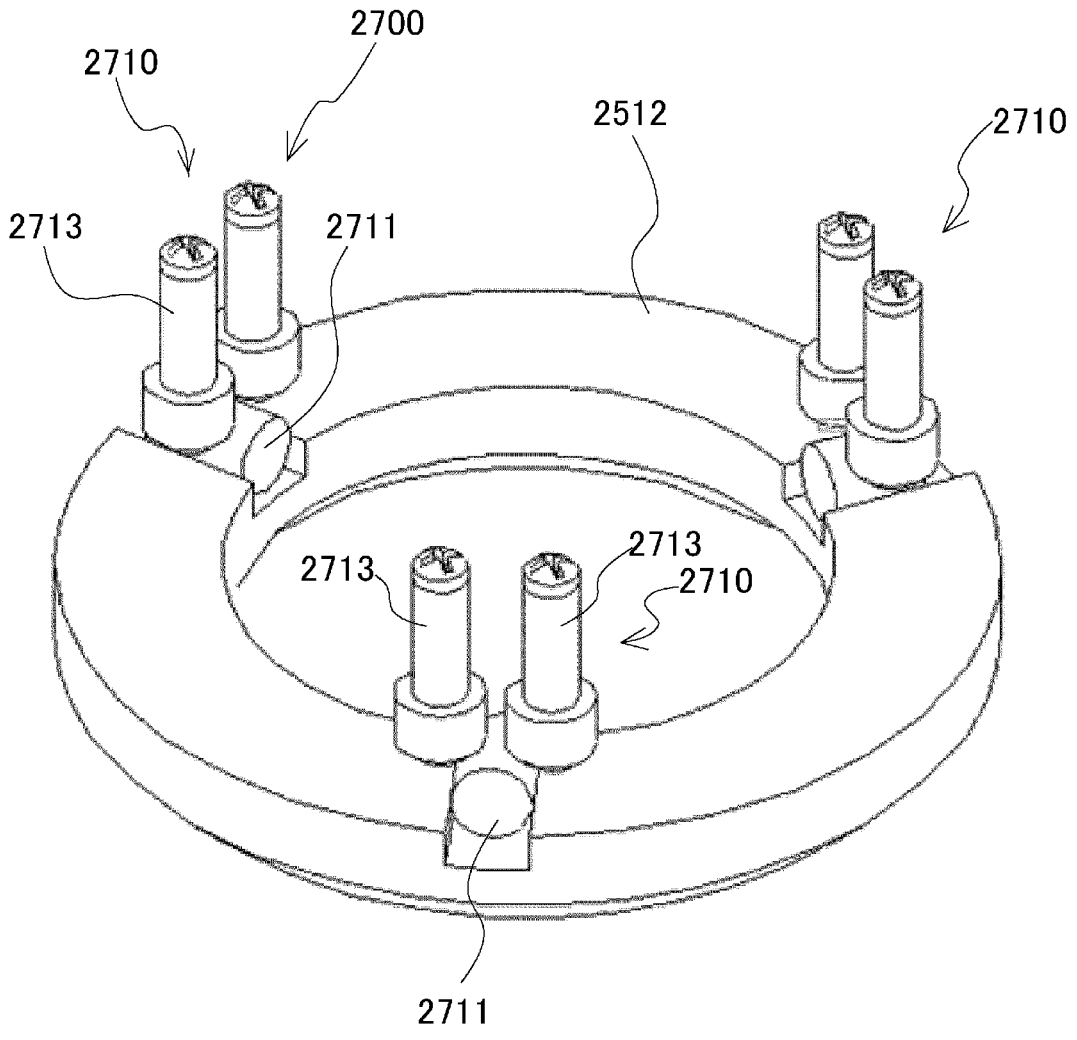
FIG. 12 is a perspective view of a cover displacement sensor.
Figure 13:
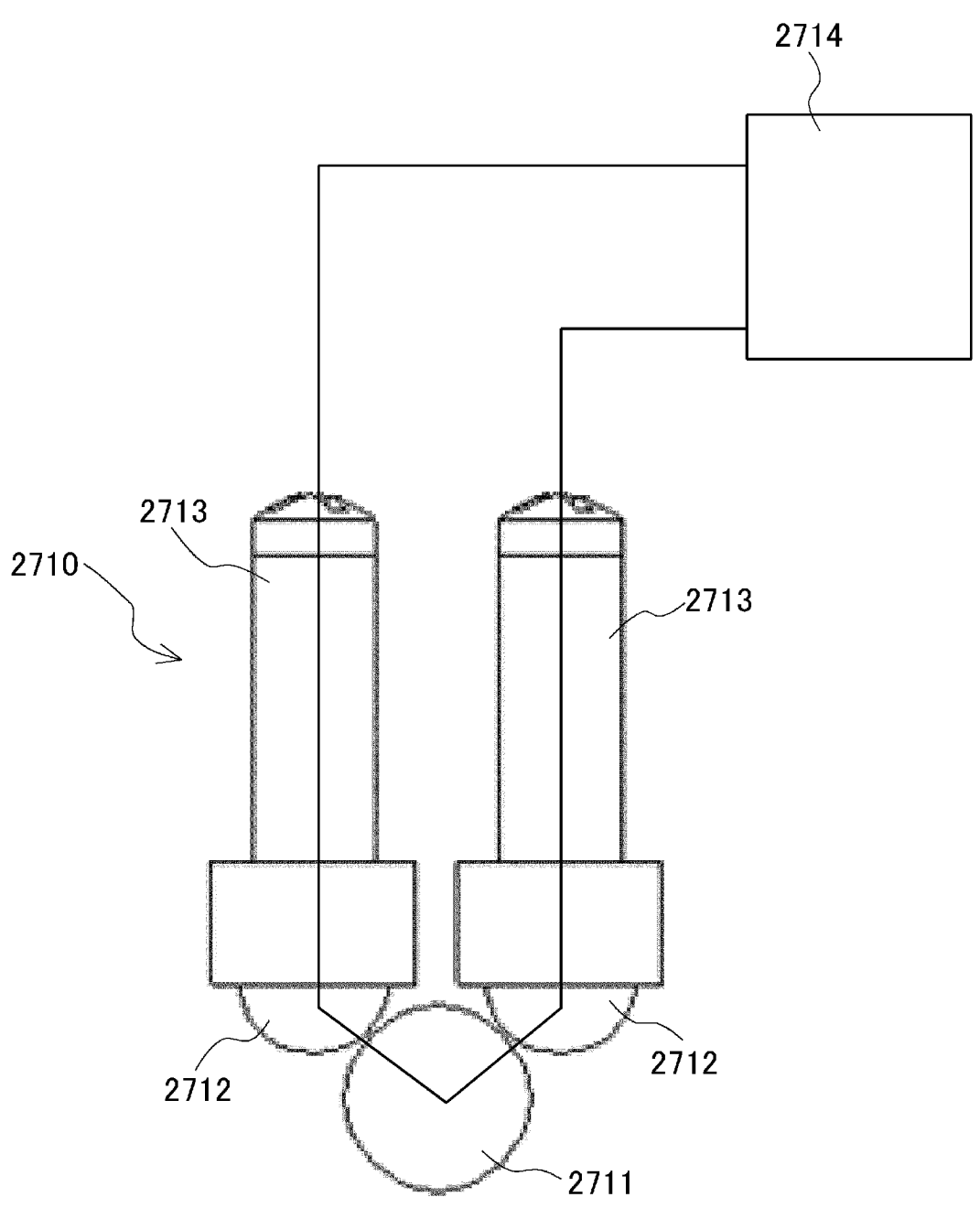
FIG. 13 is a diagram showing a configuration of a displacement sensor unit.

Each displacement sensor unit 2710 has one roller 2711 as a fixed side contact 2711, two balls 2712 as movable side contacts 2712, and a contact/separation detection circuit 2714, as shown in FIGS. 11, 12, and 13. As shown in FIG. 12, grooves along the radial direction are provided at 120° intervals on the upper face of the lower ring part 2512, and the rollers 2711 are disposed in these grooves. The rollers 2711 are almost integrated with the lower ring part 2512 (that is, the fixed ring part 2510) and serve as the fixed side contacts 2711 of the displacement sensor unit 2710.

Figure 14:
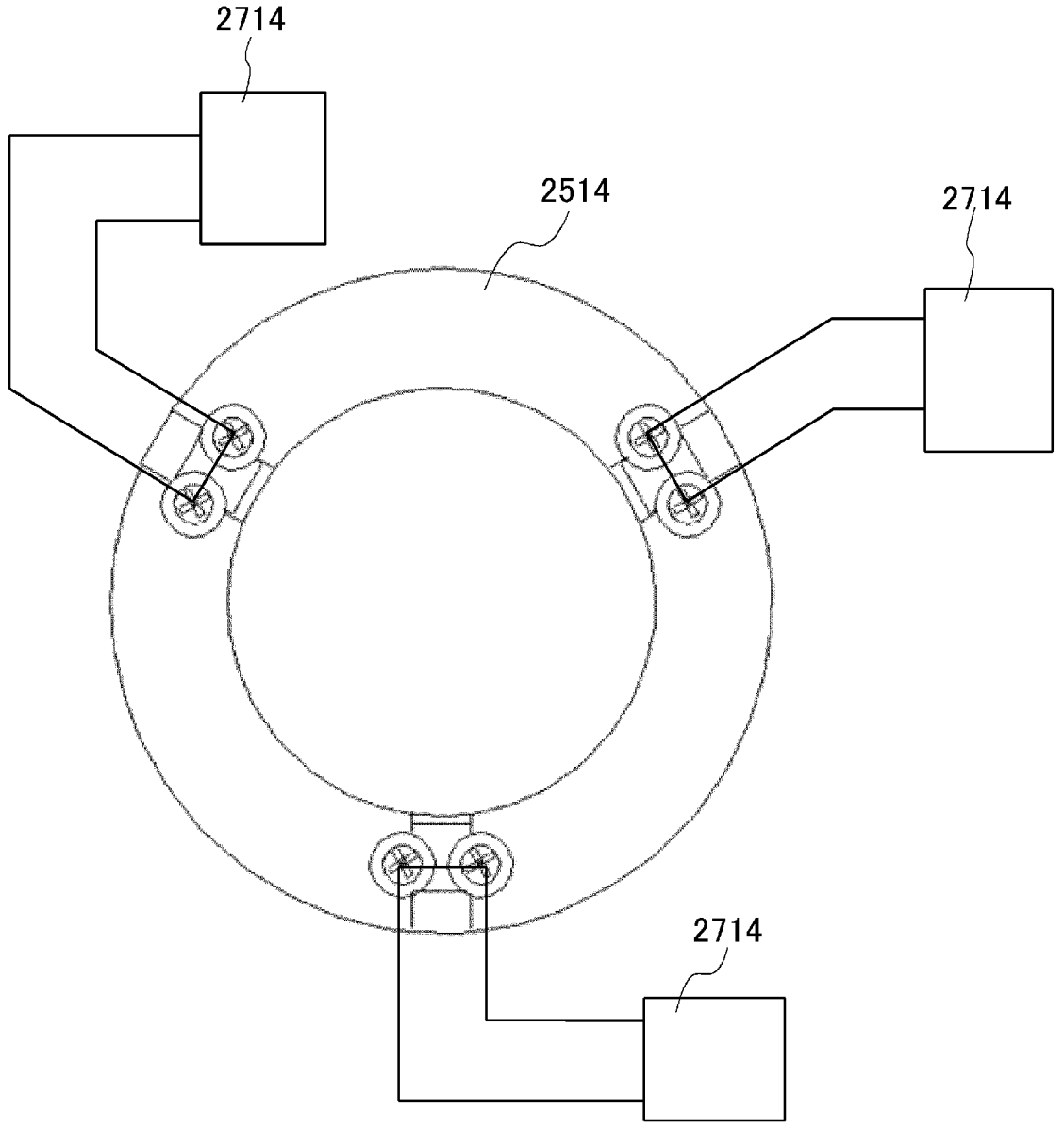
FIG. 14 is a diagram showing a contact/separation detection circuit of the displacement sensor unit.

The two balls 2712 are arranged in a direction orthogonal to the radial direction of the lower ring part 2512 or the middle ring disc 2620 (that is, along the chord), as shown in FIGS. 12, 13, and 14, and the two balls 2712 are on each roller 2711.

The two balls 2712 are attached to the lower ends of respective support rods 2713, and the support rods 2713 are fixed to the middle ring disc 2620, as shown in FIGS. 8 to 11. Therefore, the two balls 2712 are integrated with the middle ring disc 2620 (that is, the cover body part 2600) and function as the movable side contacts 2712 of the displacement sensor unit 2710 by being displaced together with the cover body part 2600.

The contact/separation detection circuit 2714 detects contact and separation between the movable side contacts (the balls 2712) and the fixed side contact (the roller 2711). The contact/separation detection circuit 2714 monitors, for example, electrical continuity between the movable side contacts (the balls 2712) and the fixed side contact (the roller 2711) to detect contact and separation between the movable side contacts (the balls 2712) and the fixed side contact (the roller 2711).

In the present exemplary embodiment, one displacement sensor unit 2710 includes one contact/separation detection circuit 2714, but three displacement sensor units 2710 may share one contact/separation detection circuit 2714. In this case, if there is contact or separation between the contacts in any one of the displacement sensor units 2710, the contact/separation detection circuit 2714 detects the contact or separation.

In the present exemplary embodiment, the three displacement sensor units 2710 are disposed at predetermined angular intervals (here, at 120° intervals). The sensitivity of contact detection can be adjusted by strengthening or weakening the biasing force of the biasing means (elasticity of the spring 2515), and the sensitivity of contact detection can also be adjusted by the arrangement of the biasing means (for example, by increasing or decreasing the diameter in which the biasing means is disposed).

When a force exceeding the elasticity of the spring 2515, which is the biasing means, is applied due to the cover body part 2600 being brought into contact with something (an obstacle) and the cover body part 2600 is displaced relative to the measuring head part 2450, the contacts in any of the displacement sensor units 2710 are separated. As a result, the displacement of the cover body part 2600, that is, the cover body part 2600 being brought into contact with something (obstacle), is detected. In addition, the position of the contact between the cover body part 2600 and the obstacle can be roughly determined by which displacement sensor unit 2710 has detected the separation.

The displacement sensor units 2710 constitute a cover contact detecting means.

Furthermore, the measuring-device main body 2000 includes a contact force detecting means (force detecting means) for detecting the force (reaction force) that the probes 2460 receive from an object to be measured. The contact force detecting means is a force sensor 2800 installed in the measuring-device attaching column 2540. As the force sensor 2800, a sensor that detects a load (F) in six axes (three axes (X, Y, Z) and moments (M) around respective axes) is known. From the detected value of the force sensor 2800, it is possible to detect the direction from which the electric inside-diameter measuring unit 2300 is receiving force. That the electric inside-diameter measuring unit 2300 receives a force means that the probes are brought into contact with the inner wall of a hole to be measured. That is, the direction in which the electric inside-diameter measuring unit 2300 is being pushed in the hole from the inner wall of the hole can be detected from the detected value of the force sensor 2800.

Figure 15:
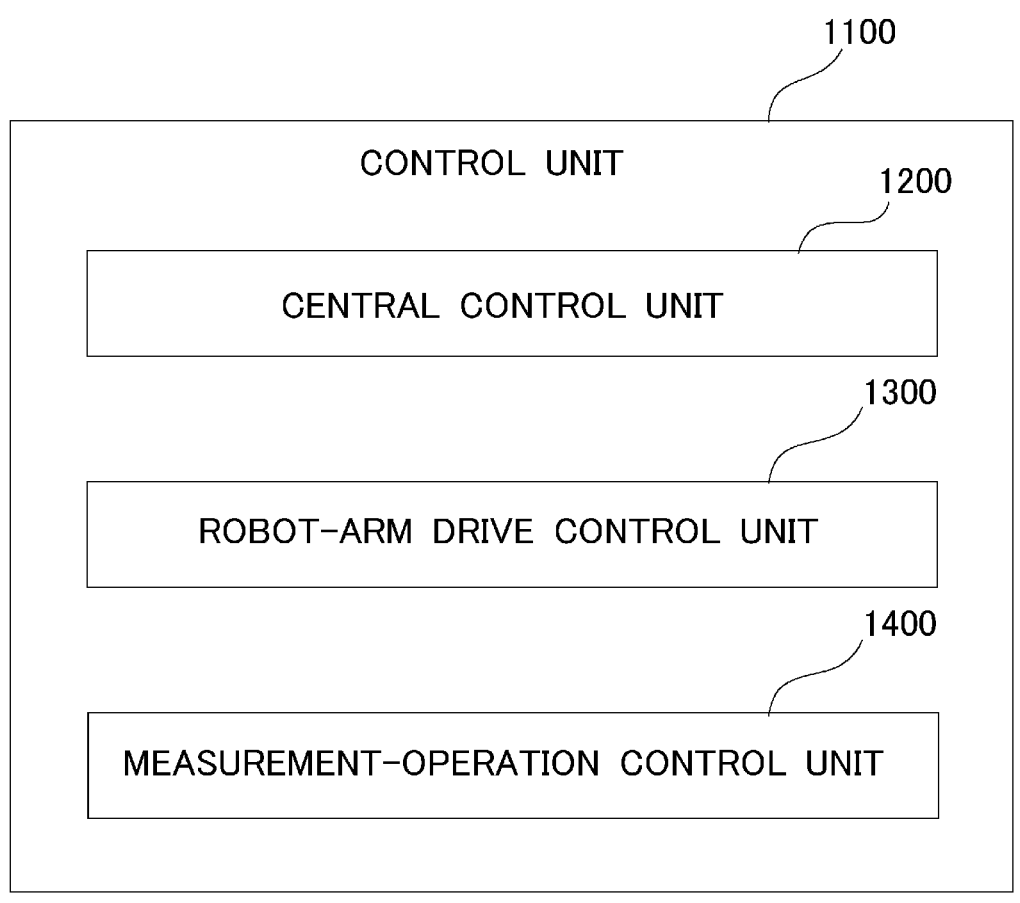
FIG. 15 is a functional block diagram showing a control unit.

FIG. 15 is a functional block diagram showing the control unit 1100.

The control unit 1100 includes a central control unit 1200, a robot-arm drive control unit 1300, and a measurement-operation control unit 1400.

The operation of each control unit is described later with reference to a flowchart.

The control unit 1100 may be implemented by hardware or software incorporated into a computer (a computer terminal including a central processing unit (CPU), a ROM or a RAM storing predetermined programs) that is connected to the measuring-device main body 2000 by wired or wireless communication. An operation control program (measuring part program) is installed in the computer terminal, and the operation of the measuring-device main body 2000 is controlled by executing the program. The method of supplying the program is not limited. The program may be installed by inserting a (nonvolatile) recording medium recording the program directly into the computer, or a reading device that reads the information on the recording medium may be attached externally to the computer to install the program into the computer from the reading device. Alternatively, the program may be supplied to the computer via a communication line, such as the Internet, a LAN cable, or a telephone line, or wirelessly.

(Control Method)

A control method for measuring a dimension (for example, an inside diameter) of a point to be measured by the automatic measuring system 1000 configured in this manner is described below.

Figure 16:
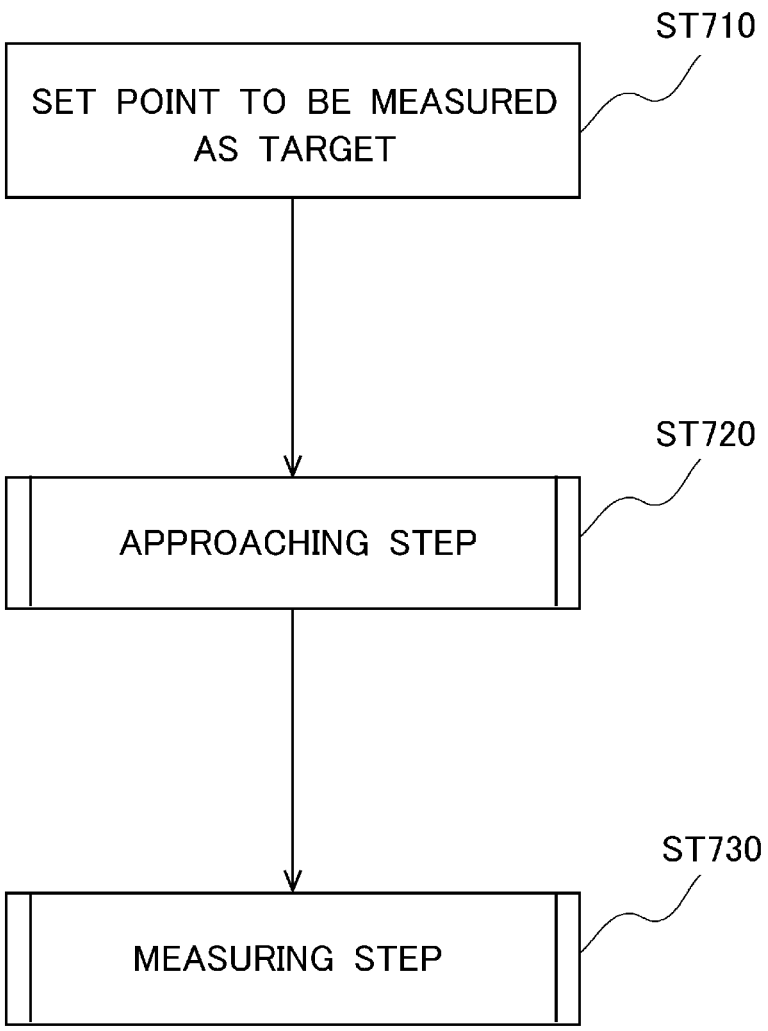
FIG. 16 is an overall flowchart showing an outline of a control method for the automatic measuring system.

FIG. 16 is an overall flowchart showing an outline of the control method for the automatic measuring system 1000.

To measure a dimension (inside diameter) of a point to be measured by the automatic measuring system 1000, first, the point to be measured is set as a target. The point to be measured (hole) whose dimension (inside diameter) is to be measured in a workpiece, which is an object to be measured, is set as the target in the control unit 1100 (ST710). For example, based on the set value data (CAD data) about the workpiece, the point to be measured is set and registered in the control unit 110. Then, even if an operator leaves the automatic measuring system 1000, the automatic measuring system 1000 automatically performs measurement of the set points to be measured sequentially.

Steps for measuring a point to be measured set as the target are roughly divided into an approaching step (ST720) and a measuring step (ST730).

The approaching step (ST720) is described below.

Figure 17:
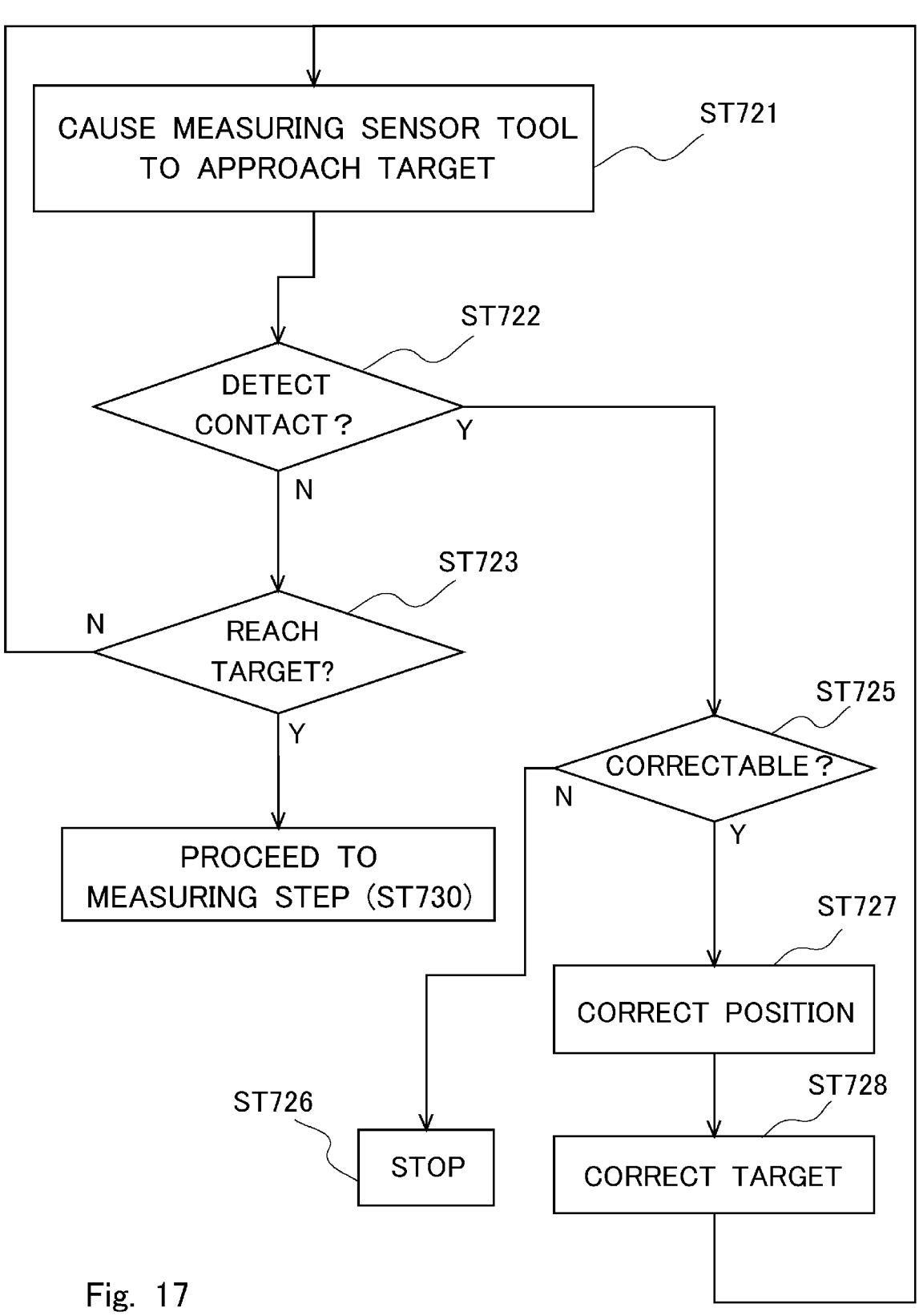
FIG. 17 is a flowchart for explaining an approaching step.

FIG. 17 is a flowchart for explaining the approaching step (ST720).

The electric inside-diameter measuring unit (measuring sensor tool) 2300 is caused to approach the point to be measured set as the target (ST721). That is, the measuring head part 2450 of the electric inside-diameter measuring unit 2300 is moved to be inserted into the point to be measured (hole) by controlling the movement of the finger part 2130 of the robot arm part 2100.

During the approaching step (ST720), the detection value of the cover displacement sensor 2700 of the cover part 2500 is constantly monitored for any unexpected collision with the cover part 2500. If the hole has been formed as designed at the set position in the object to be measured, the measuring head part 2450 of the electric inside-diameter measuring unit (measuring sensor tool) 2300 goes straight into the hole to be measured together with the cover part 2500. Therefore, as long as the hole has been formed as designed at the set position in the object to be measured, the cover displacement sensor 2700 does not detect any displacement in the approaching step in which the measuring head part 2450 of the electric inside-diameter measuring unit (measuring sensor tool) 2300 reaches the target position (ST722: No).

Figure 19:
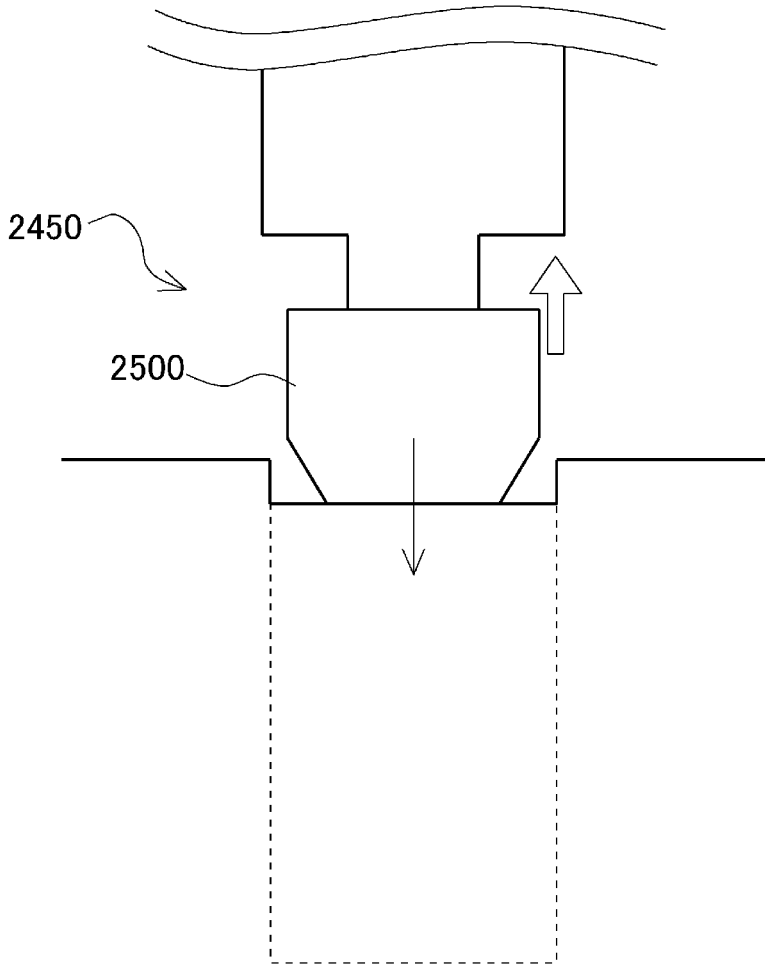
FIG. 19 is a diagram showing a case of a shallow machined hole.

If a hole has not been formed as designed at the set position in the object to be measured, the hole is not machined at all in an extreme case, or the machined hole is too shallow, as shown in FIG. 19. In such a case, the lower surface of the cover part 2500 (the lower side shield part 2633) are brought into straight and even contact with the surface of the object to be measured, and all of the displacement sensor units 2710 equally detect displacement (separation of the contacts). From the detection of the cover displacement sensor 2700, it is not possible to determine in which direction the relative position and relative posture between the hole and the electric inside-diameter measuring unit (measuring sensor tool) 2300 are shifted, whether they are relatively shifted in the left-right (horizontal) direction or shifted in inclination (tilt) direction. In this case, it is known that the cover part 2500 is in contact with something, but the direction of correction is not known (ST725: No). Therefore, it is dangerous to continue moving the electric inside-diameter measuring unit (measuring sensor tool) 2300 any further, and the robot arm part 2100 stops the movement of the electric inside-diameter measuring unit 2300 (ST726). Alternatively, the robot arm part 2100 may change the direction of relative movement between the electric inside-diameter measuring unit (measuring sensor tool) 2300 and the object to be measured to the opposite direction, continue the movement to a position where the displacement detected by the cover displacement sensor returns to zero, and then stop the movement of the electric inside-diameter measuring unit 2300 (ST726).

Even if the cover part 2500 is brought into contact with the object to be measured, the object to be measured will not be damaged because the cover part 2500 is supported so as to be displaceable, and no unnecessary force will be applied to the electric inside-diameter measuring unit 2300 and the robot arm part 2100.

In some cases, the position and centerline of a hole in the object to be measured can be machined with a slight error from the set value.

Figure 20:
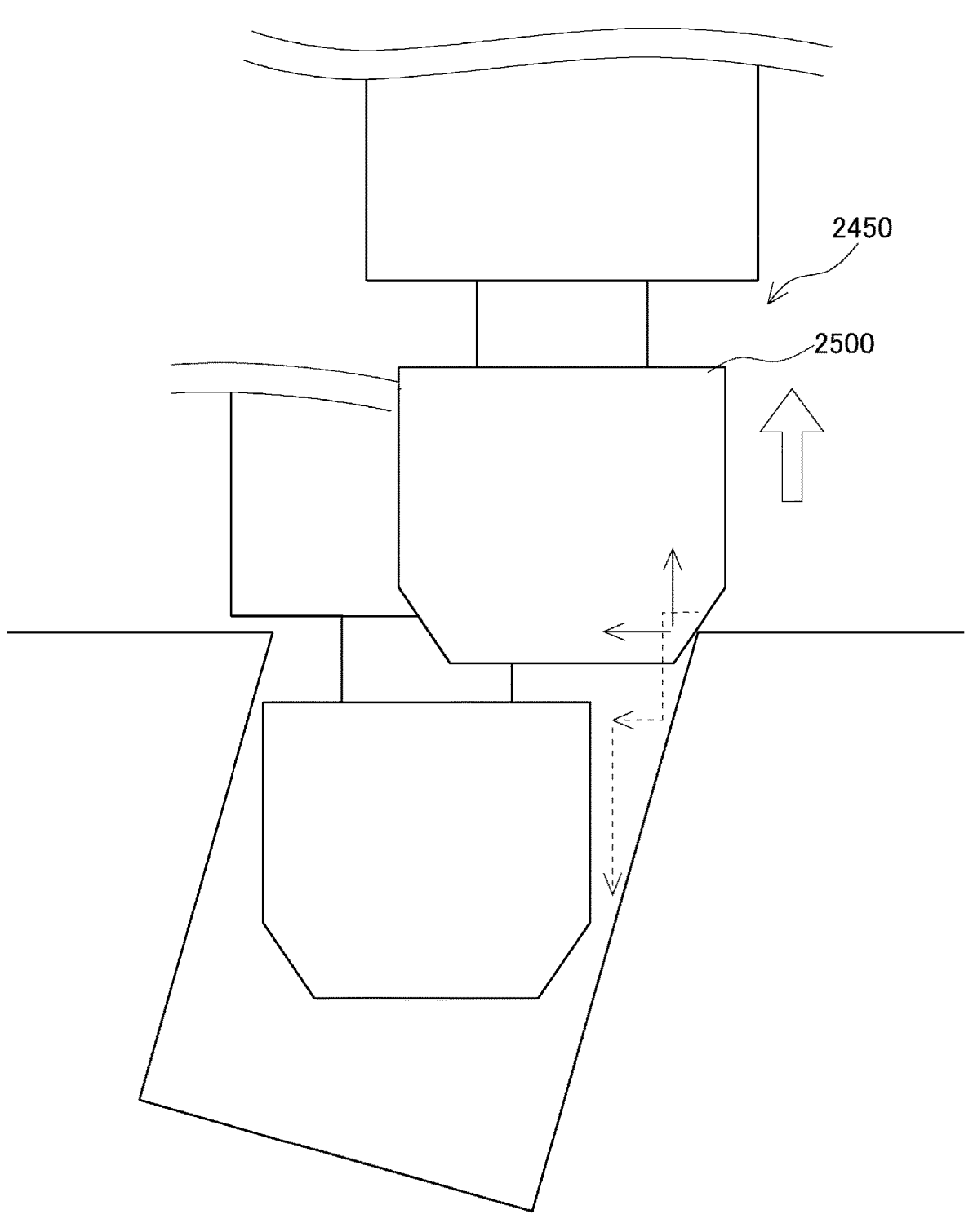
FIG. 20 is a diagram showing that the cover part is brought into contact with a part of a hole.

For example, this is the case in FIG. 20.

In this case, a part of the cover part 2500 can be brought into contact with the edge of the hole. Then, the cover part 2500 is partially pushed up and inclined. This displacement of the cover part 2500 is detected by the cover displacement sensor 2700. The displacement detected by the cover displacement sensor 2700 indicates the point of the contact between the cover part 2500 and the object to be measured (conversely, this indicates the point where the cover part 2500 is not in contact with the object to be measured), and the robot arm part 2100 corrects the position of the electric inside-diameter measuring unit 2300 (ST727) in the direction in which the cover part 2500 is not brought into contact with the object to be measured so in order for the cover part 2500 not to be pushed any further. The robot arm part 2100 further continues moving the electric inside-diameter measuring unit 2300 until the detection value of the cover displacement sensor 2700 returns to zero, and shifts the XY coordinates of the target position to reflect the corrected position (ST728).

Continuing this process, the measuring head part 2450 enters the target hole and reaches the (corrected) target (ST723).

When the electric inside-diameter measuring unit 2300 reaches the target position, the process proceeds to the measuring step (ST730) to measure the inside diameter of the hole.

Although the cover part 2500 is brought into contact with the object to be measured several times during the approaching step, the object to be measured will not be damaged because the cover part 2500 is supported so as to be displaceable, and no excessive force will be applied to the electric inside-diameter measuring unit 2300 and the robot arm part 2100.

Figure 18:
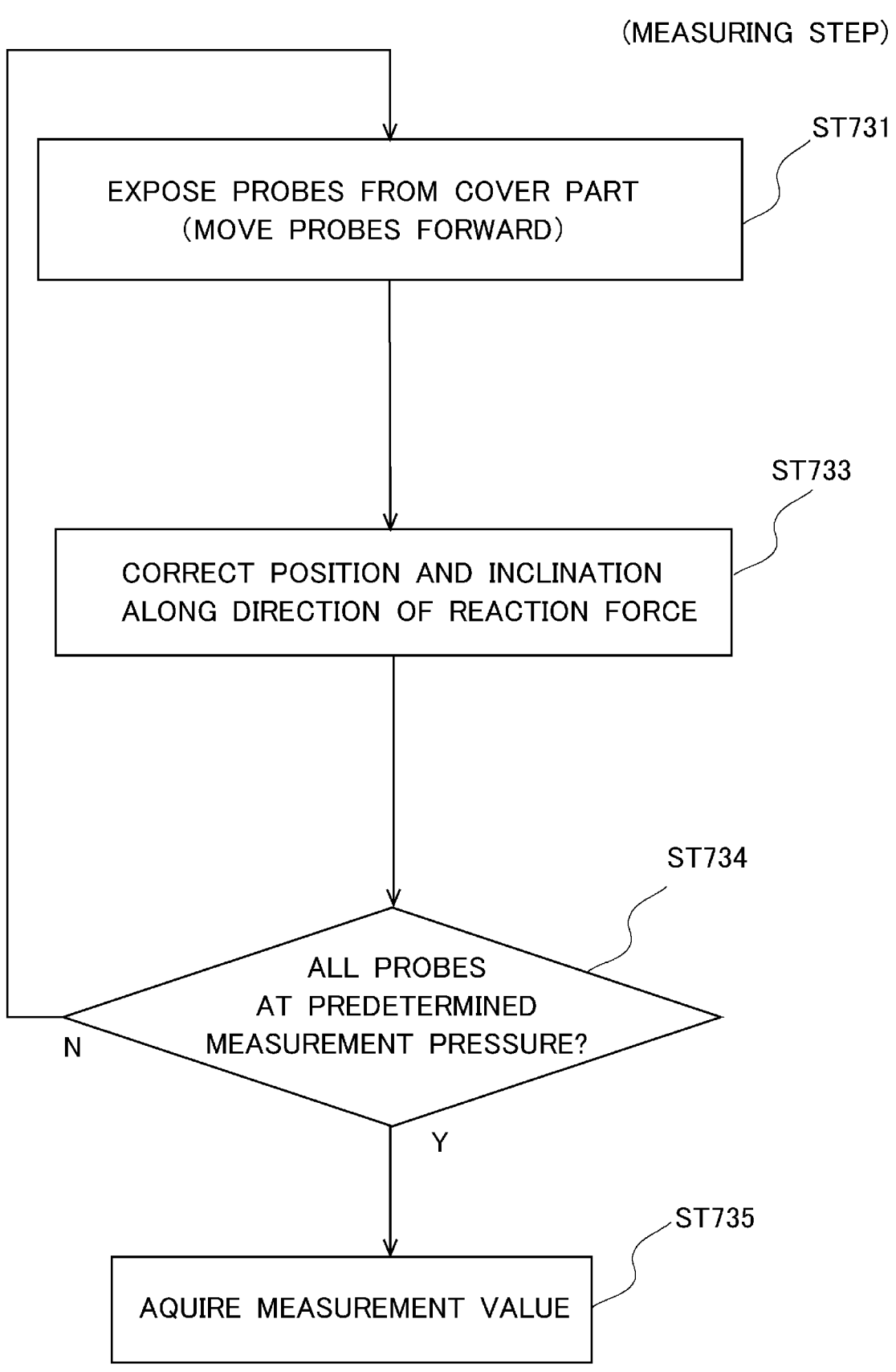
FIG. 18 is a flowchart for explaining a measuring step.

FIG. 18 is a flowchart for explaining the measuring step (ST730).

When the measuring head part 2450 of the electric inside-diameter measuring unit 2300 enters the point to be measured (hole), the operation of the robot arm part 2100 is temporarily stopped, and the motor 2330 of the electric inside-diameter measuring unit 2300 is driven to move the probes 2460 forward (ST731).

Figure 21:
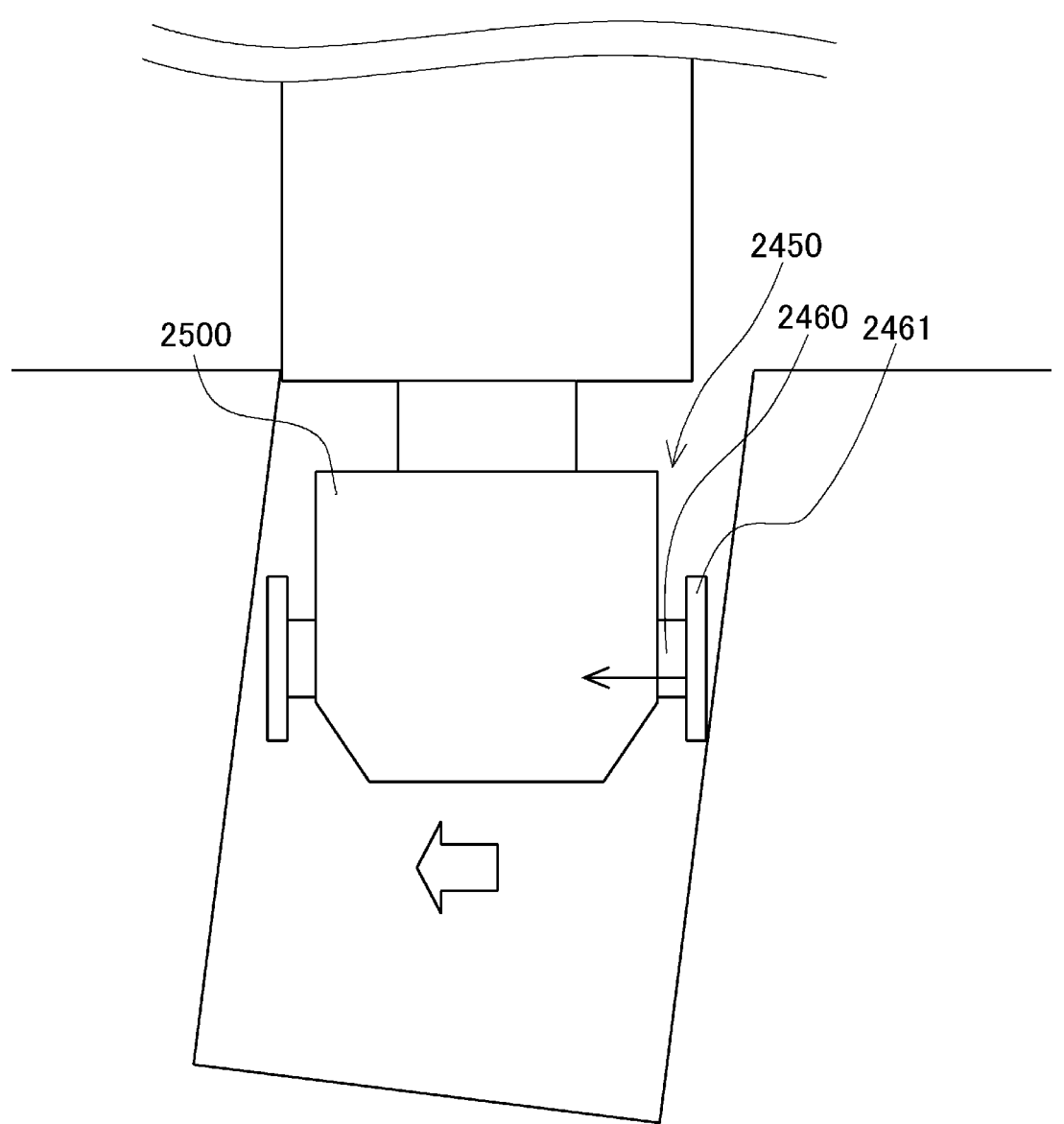
FIG. 21 is a diagram showing that the probe is brought into contact with an inner wall of a hole.

This causes the probes 2460 to move out of the slits 2632 in the cover part 2500 to bring the probes 2460 into contact with the inner wall of the hole, as shown in FIG. 21, for example.

When the probes 2460 are brought into contact with the inner wall of the hole, the force applied to the probes 2460 is transmitted from the electric inside-diameter measuring unit 2300 to the measuring-device attaching column 2540, and the force applied to the electric inside-diameter measuring unit 2300 is detected by the force sensor 2800 as the contact force detecting means.

Once the force is detected by the force sensor 2800 (the contact force detecting means), the position and inclination of the electric inside-diameter measuring unit 2300 are adjusted in the direction in which the force is reduced, that is, in the direction in which the electric inside-diameter measuring unit 2300 is pushed (while the height position of the electric inside-diameter measuring unit 2300 is kept unchanged).

For example, when one of the probes 2460 is brought into contact with the inner wall of the hole before the other probes 2460, as shown in FIG. 21, the electric inside-diameter measuring unit 2300 is pushed in one direction, and the robot arm part 2100 shifts the electric inside-diameter measuring unit 2300 in the horizontal direction (the left in FIG. 21).

In FIG. 21, the probes are shown as if they are disposed at 180° intervals to make it easier to understand how the probes 2460 move forward, but this is deformed to show the operation in the present exemplary embodiment for ease of understanding. Alternatively, this can be interpreted as a 120° cross-sectional view. The same applies to FIGS. 22, 23, and 27.

Figure 22:
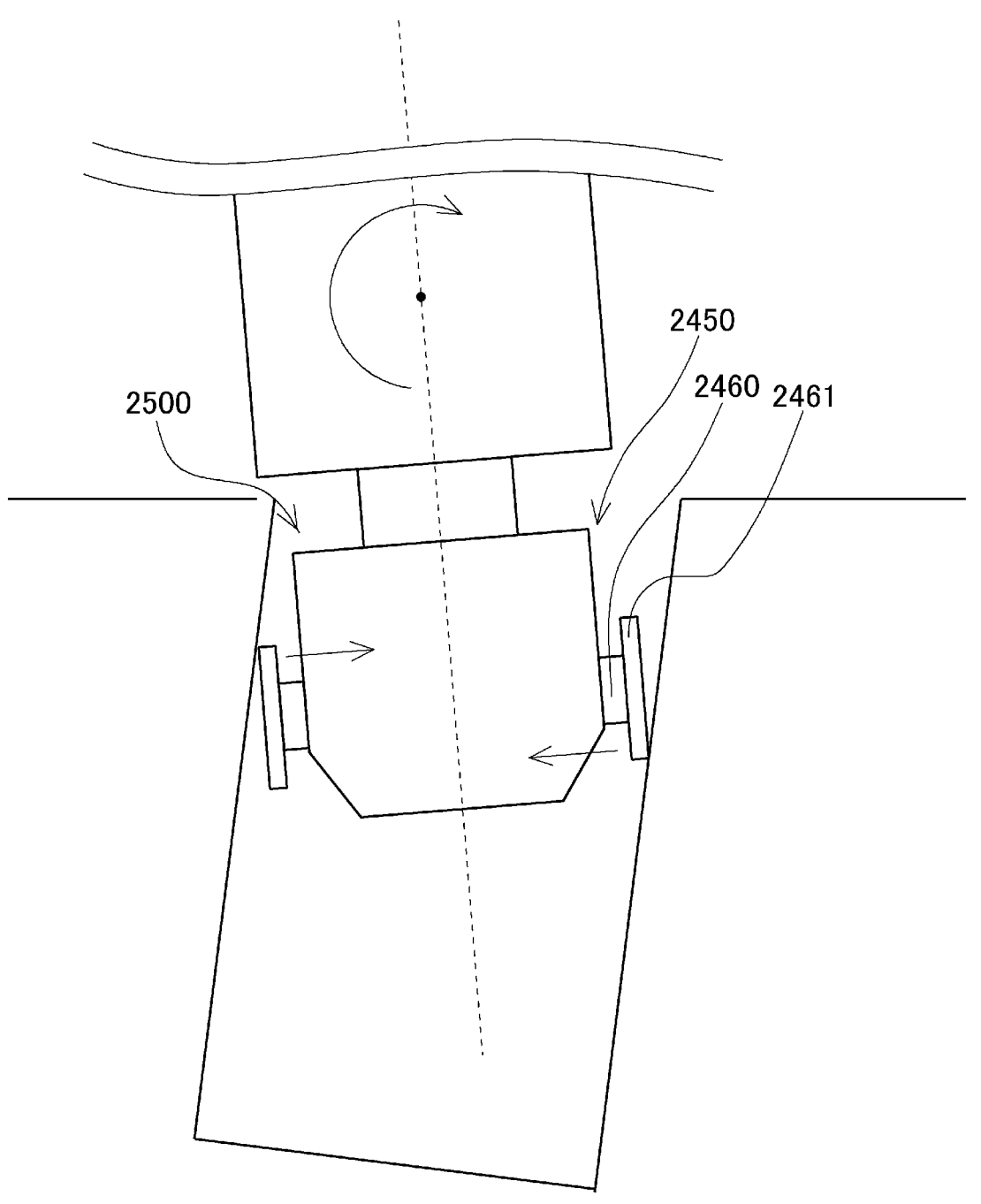
FIG. 22 is a diagram showing that two probes are brought into partial contact with an inner wall of a hole.

For example, when two or three of the probes 2460 are brought into partial contact with the inner wall, as shown in FIG. 22, the force sensor 2800 detects a moment of rotation through the electric inside-diameter measuring unit 2300 and the measuring-device attaching column 2540, and the robot arm part 2100 changes the inclination.

Figure 23:
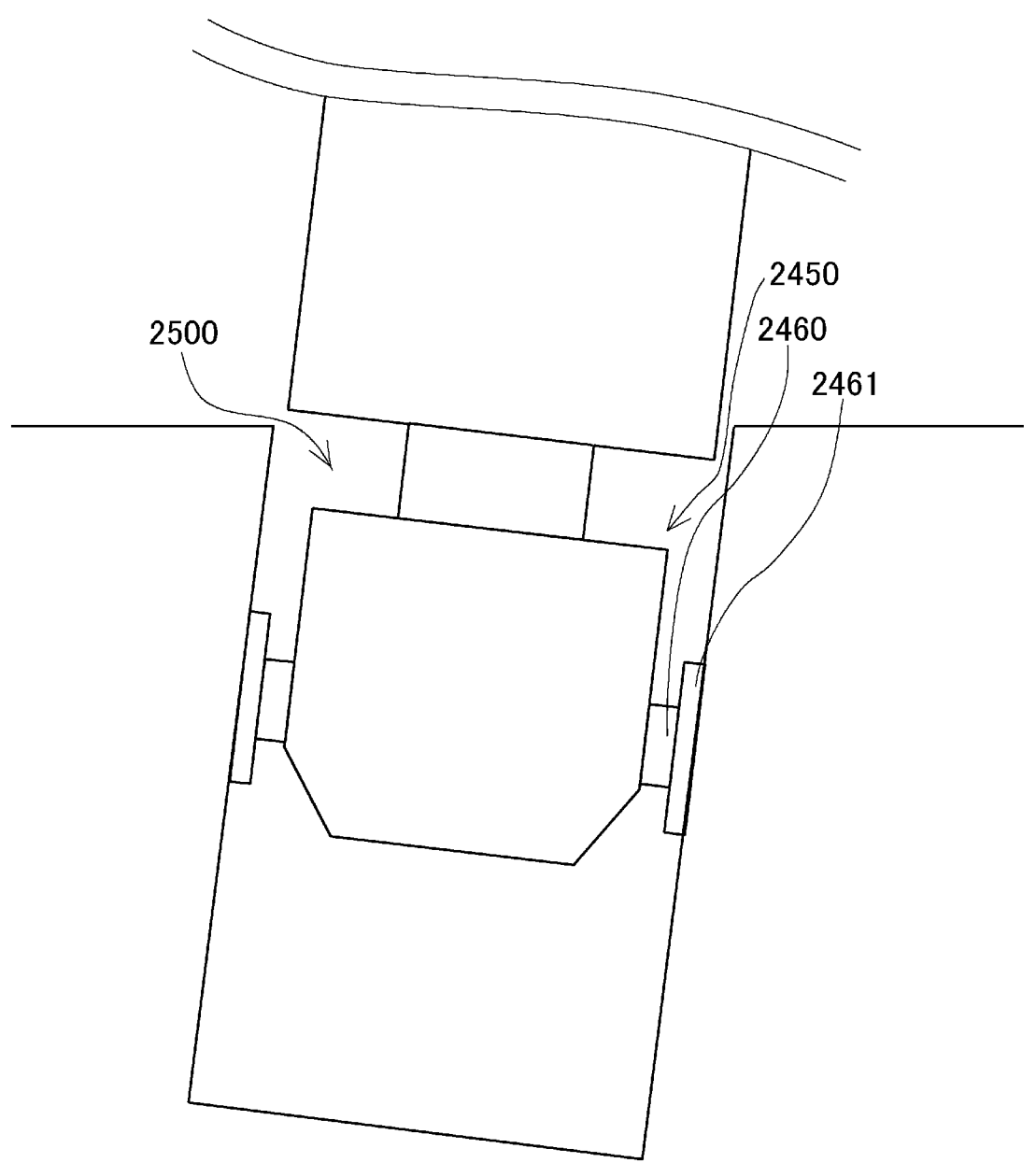
FIG. 23 is a diagrams showing that the inner diameter of a hole is measured.

Eventually, as shown in FIG. 23, for example, when all of the three probes 2460 are in close contact with the inner wall of the hole, that is, when the forces detected by the force sensor 2800 in the respective directions are equal (or substantially zero) (ST734), the displacement (position) of the probes 2460 is sampled as a measurement value (ST735).

The fact that all of the three probes 2460 are in close contact with the inner wall of the hole can be judged by, for example, that the position and the posture of when the electric inside-diameter measuring unit 2300 is moved minutely left and right and inclined very slightly by the robot arm part 2100, the differences between the force values in the respective directions detected by the force sensor 2800 are minimized.

When the force values in the respective directions detected by the force sensor 2800 are equal and when the contact pressure applied to the probes 2460 reaches a predetermined measurement pressure, the displacement (position) of the probes 2460 is sampled as a measurement value (ST735).

In this manner, the measurement of one point to be measured (hole diameter) in one workpiece is completed.

The approaching step (ST720) and the measuring step (ST730) are repeated while sequentially changing the targets that are the points to be measured, and the registered points to be measured in the workpiece are sequentially measured.

By further repeating ST710 to ST730 while the workpiece is replaced, unmanned automatic measurement is performed.

As described above, with the present exemplary embodiment, it is possible to automatically perform measurement of a dimension or shape using a measuring device.

In particular, it is possible for a robot to automatically perform measurement of a dimension or shape in which a collision between a measuring device and an object, such as when the measuring device enters a hole.

Second Exemplary Embodiment

In the above exemplary embodiment, all steps to cause the position and posture of the electric inside-diameter measuring unit 2300 to follow a hole to be measured are performed by controlling the operation (movement or rotation) of the finger part 2130 of the robot arm part 2100.

However, it can be difficult to complete all of the position and posture adjustments of the electric inside-diameter measuring unit 2300 only by controlling the operation of the finger part 2130 of the robot arm part 2100, due to the sensitivity limitations of the various sensors and the operations errors of the robot arm part 2100.

Therefore, in a second exemplary embodiment, it is proposed that a compliance mechanism is used together.

Figure 24:
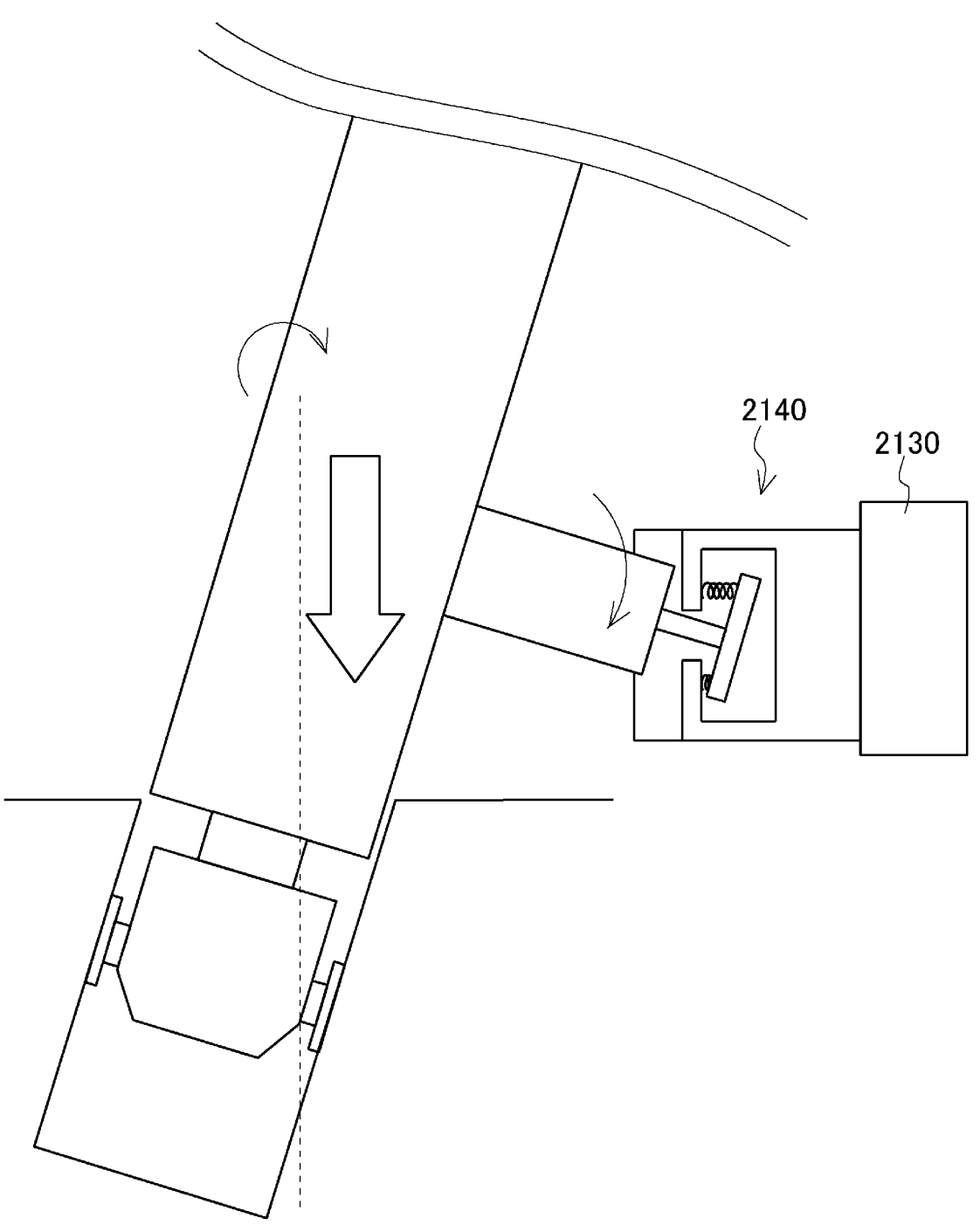
FIG. 24 is a diagram showing that an electric inside-diameter measuring unit enters a hole so as to follow the hole in a second exemplary embodiment.

A compliance mechanism 2140 is provided between the finger part 2130 of the robot arm part 2100 and the tool, as shown in FIG. 24, for example, and is capable of absorbing relative misalignment (axis misalignment) between the finger part 2130 and the tool within a predetermined range, and of recovering the relative position between the finger part 2130 and the tool.

The compliance mechanism 2140 can be implemented by a floating joint having an interposed elastic member.

In the second exemplary embodiment, the elasticity of the spring that biases the cover body part 2600 in the cover part 2500 may be increased to some extent, in anticipation of the compliance mechanism 2140 being able to absorb some degree of misalignment.

Alternatively, misalignment can be considered to be absorbed by the compliance mechanism 2140 before the cover part 2500 is displaced.

In the second exemplary embodiment, if no displacement of the cover part 2500 is detected by the cover displacement sensor 2700 even when the cover part 2500 is brought into contact with the inner wall of a hole or the like, the electric inside-diameter measuring unit 2300 is inserted into the hole until the measuring head part 2450 reaches the target, using the absorption of misalignment by the compliance mechanism 2140.

FIG. 24 is a diagram showing an approaching step in the second exemplary embodiment.

As shown in FIG. 24, the electric inside-diameter measuring unit 2300 enters and follows the hole while changing the position or inclination within the range in which misalignment is absorbed by the compliance mechanism 2140.

If the electric inside-diameter measuring unit 2300 is pushed into an object to be measured to the extent that displacement is detected by the cover part 2500, the position and target position of the electric inside-diameter measuring unit 2300 may be corrected by controlling the operation of the finger part 2130 of the robot arm part 2100, as in the first exemplary embodiment.

Figure 25:
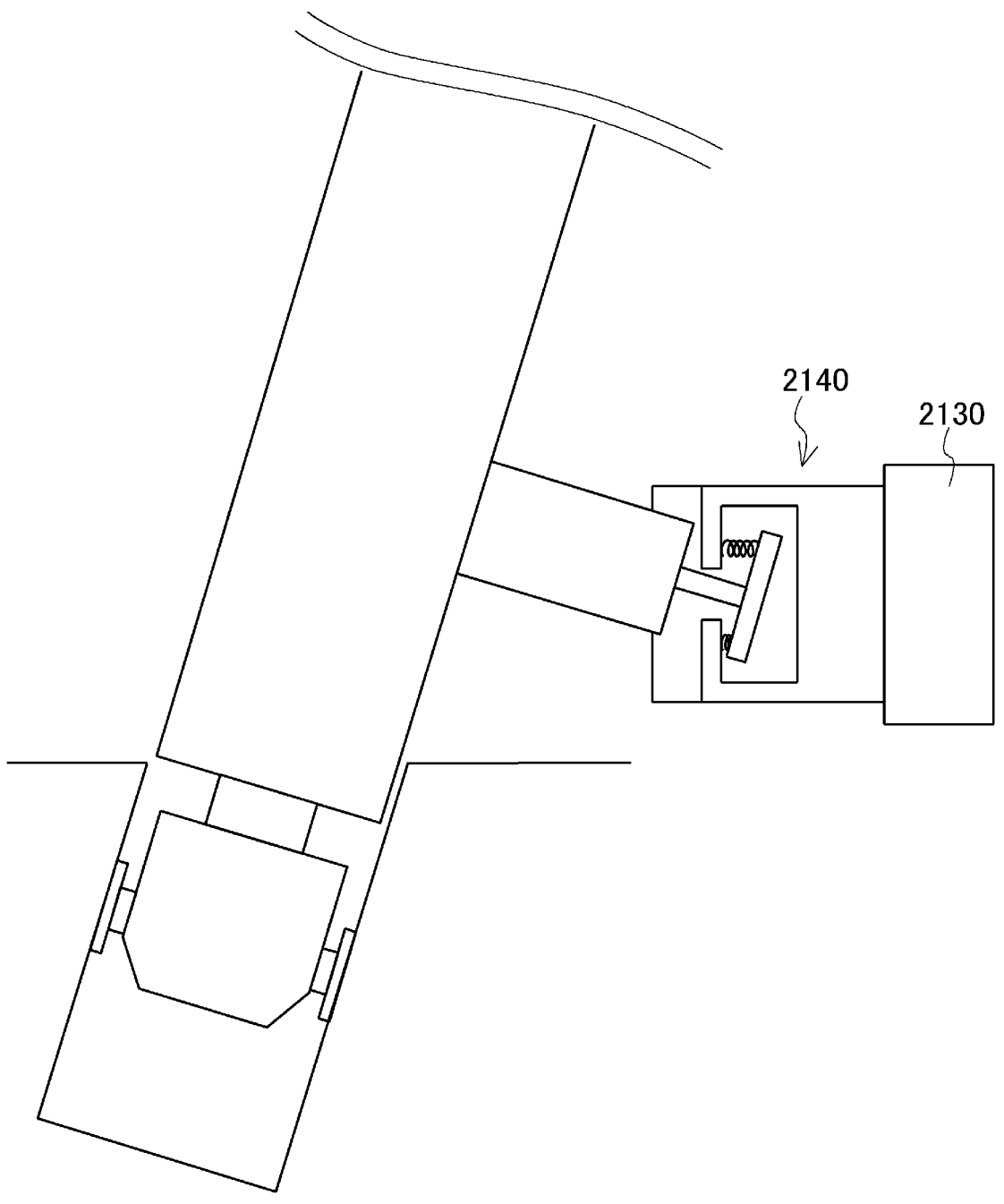
FIG. 25 is a diagram showing that a probe pushes against an inner wall of a hole in the second exemplary embodiment.

FIG. 25 is a diagram showing a measuring step in the second exemplary embodiment.

Since any displacement within a predetermined range is absorbed by the compliance mechanism 2140, the position and inclination of the electric inside-diameter measuring unit 2300 is automatically absorbed by the force of the three probes 2460 pushing against the inner wall of a hole, as shown in FIG. 25, and the axis of the electric inside-diameter measuring unit 2300 is aligned with the axis of the hole.

If the force detected by the force sensor 2800 is too large (a threshold may be set to trigger the operation control of the finger part 2130 of the robot arm part 2100), the position, posture, and target of the electric inside-diameter measuring unit 2300 may be finely adjusted by controlling the operation of the finger part 2130 of the robot arm part 2100.

First Modification

In addition to the contact-type probes 2460 described above, non-contact probes may also be used. Examples thereof includes laser probes, optical probes (for example, non-contact chromatic confocal sensors), capacitive probes, and the like.

Figure 26:
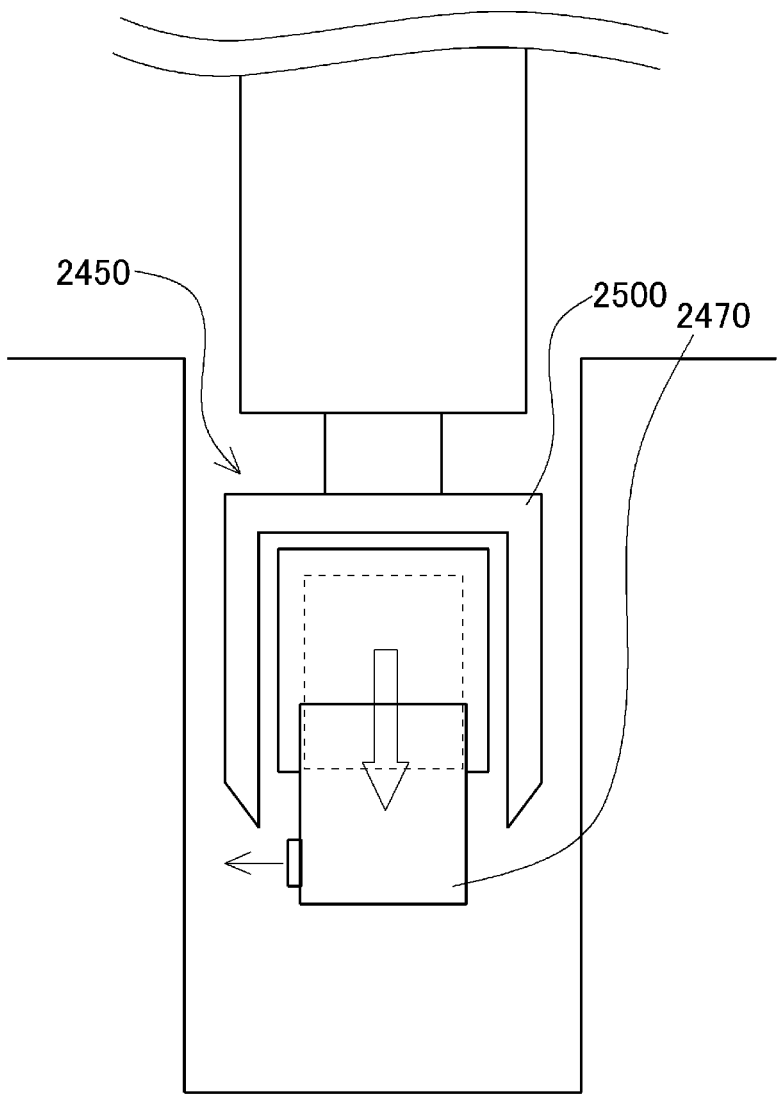
FIG. 26 is a diagram showing a first modification as an example.

In a case in which laser probes are used as the probes (probe), the laser may be irradiated through the slits 2632 in the shield cylinder part 2630 (the cover part 2500) and the reflected light may be received through the slits 2632. Alternatively, as shown in FIG. 26, a laser probe unit 2470 may be moved forward and backward in the axial direction from the measuring head part 2450 by a linear motor or the like to expose the laser probe unit 2470 from the cover part 2500 after the approaching step is completed.

The present invention is not limited to the above embodiments, and may be modified as needed without departing from the gist.

The measuring sensor tool may be a measuring device (measuring part) that measures dimensions (inside and outside dimensions) of a workpiece (object to be measured) by contact, instead of the electric inside-diameter measuring device.

A measuring sensor tool in which a movable element (which is variously referred to as a probe, a measuring jaw, a spindle, or the like) is displaceable with respect to a fixed element and measures a dimension of a workpiece by bringing the probe into contact with the workpiece or by clamping the workpiece with the probe is applicable to the above embodiments. Examples of the measuring sensor tool include calipers, micrometer heads, micrometers, digital dial gauges (indicators), test indicators (lever-type dial gauges), and the like.

Examples of the non-contact measuring sensor tool include image measuring devices with telecentric lens systems, as well as capacitive sensors, laser detectors, confocal sensors, and the like.

Although the example in which the force sensor 2800 is provided in the measuring-device attaching column 2540 as the contact force detecting means (force detecting means) is described, a strain gage may be installed on the probes. One strain gage may be installed on each probe, or multiple strain gages may be installed on each probe. For example, detailed information on the contact state between each probe and the inner wall of a hole can be obtained by attaching strain gauges to the upper side (upper edge) and lower side (lower edge) of each probe.

1000 Automatic measuring system
1100 Control unit
1200 Central control unit
1300 Robot-arm drive control unit
1400 Measurement-operation control unit
2000 Measuring-device main body
2010 Rotary table
2100 Robot arm part
2110 Base part
2120 Arm part
2130 Finger part
2140 Compliance mechanism
2300 Electric inside-diameter measuring unit
2330 Motor
2340 Rod
2400 Cylinder case part
2400 Upper cylinder case part
2400 Middle cylinder case part
2400 Lower cylinder case part
2440 Head cylinder part
2450 Measuring head part
2460 probe
2461 Round Shaft Tip
2470 Laser probe unit
2500 Cover part
2510 Fixed ring part
2511 Upper ring part
2512 Lower ring part
2513 Main coupling column
2514 Sub-coupling column
2515 Spring (biasing means)
2540 Measuring-device attaching column
2600 Cover body part
2620 Middle ring disc
2621 Recessed part
2622 Through hole
2623 Counterbore hole
2630 Shield cylinder part
2631 Side shield part
2632 Slit
2633 Lower side shield part
2700 Cover displacement sensor
2710 Displacement Sensor Unit
2711 Fixed side contact (roller)
2712 Movable side contact (ball)
2713 Support rod
2714 Contact/separation detection circuit
2800 Force sensor

The invention claimed is:
1. An automatic measuring system comprising:
a measuring sensor tool configured to detect a surface of an object to be measured with a probe to measure a dimension or a shape of the object to be measured; and
a moving mechanism configured to relatively move the measuring sensor tool with respect to the object to be measured, wherein
the measuring sensor tool includes a cover part to protect the probe,
in an approaching step in which the moving mechanism causes the measuring sensor tool to approach a point to be measured of the object to be measured, the cover part accommodates the probe inside the cover part, and after the approaching step is completed, the probe is exposed from the cover part to detect the surface of the object to be measured.

2. The automatic measuring system according to claim 1, further comprising:

a cover contact detecting means for detecting contact between the cover part and the object to be measured, wherein when contact between the cover part and the object to be measured is detected by the cover contact detecting means in the approaching step, the moving mechanism is configured to stop the relative movement between the measuring sensor tool and the object to be measured or move the measuring sensor tool and the object to be measured in a direction opposite to a direction of the movement at that time.

3. The automatic measuring system according to claim 1, further comprising:

a cover contact detecting means for detecting contact between the cover part and the object to be measured, wherein when contact between the cover part and the object to be measured is detected by the cover contact detecting means in the approaching step, the moving mechanism is configured to relatively move the measuring sensor tool and the object to be measured in a direction in which an acting force applied from the object to be measured to the cover part is reduced.

4. The automatic measuring system according to claim 1, wherein the measuring sensor tool is configured to bring one or more of the probes into contact with the object to be measured at a predetermined measurement pressure to acquire the dimension or the shape of the object to be measured, the automatic measuring system further comprises a force detecting means for detecting a direction and a magnitude of a force received by the one or more of the probes from the object to be measured, the force detecting means is provided on the measuring sensor tool or on an attaching column to be used to attach the measuring sensor tool to the moving mechanism, and the moving mechanism is configured to relatively move, based on the force detected by the force detecting means, the measuring sensor tool and the object to be measured in such a manner that a measurement pressure of the one or more of the probes is equal to the predetermined measurement pressure.

5. The automatic measuring system according to claim 1, wherein the probe is a non-contact probe configured to detect the surface of the object to be measured without contact.

6. The automatic measuring system according to claim 1, wherein the moving mechanism is an articulated robot, the measuring sensor tool is supported by a finger part of the articulated robot, a compliance mechanism is provided between the finger part and the measuring sensor tool, and is configured to absorb relative misalignment between the finger part and the measuring sensor tool and to recover the relative position between the finger part and the measuring sensor tool, when the cover part is brought into contact with the object to be measured in the approaching step, the moving mechanism causes the measuring sensor tool to approach the point to be measured while the compliance mechanism absorbs the relative misalignment between the finger part and the measuring sensor tool to automatically adjust a relative posture between the measuring sensor tool and the point to be measured, and after the approaching step is completed, the probe is exposed from the cover part to detect the surface of the object to be measured while the moving mechanism is stopped.

7. A control method for an automatic measuring system, the automatic measuring system including:

a measuring sensor tool configured to detect a surface of an object to be measured with a probe to measure a dimension or a shape of the object to be measured; and a moving mechanism configured to relatively move the measuring sensor tool with respect to the object to be measured, the measuring sensor tool including a cover part to protect the probe, the control method comprising:

accommodating, by the cover part, the probe inside the cover part, causing, by the moving mechanism, the measuring sensor tool to approach a point to be measured of the object to be measured, and after the approach is completed, exposing the probe from the cover part and detecting, by the probe, the surface of the object to be measured while the moving mechanism is stopped.

* * * * *